*Inventor*
A. J. Henquet - J. J. Perrot
*Attorney*

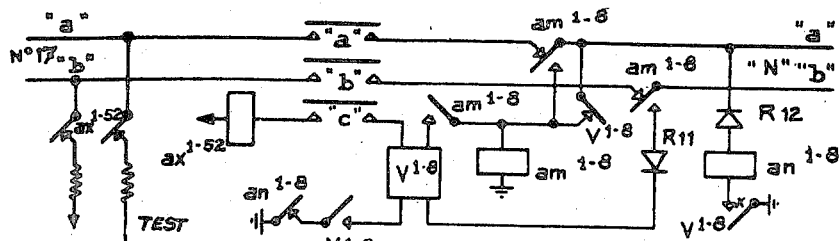
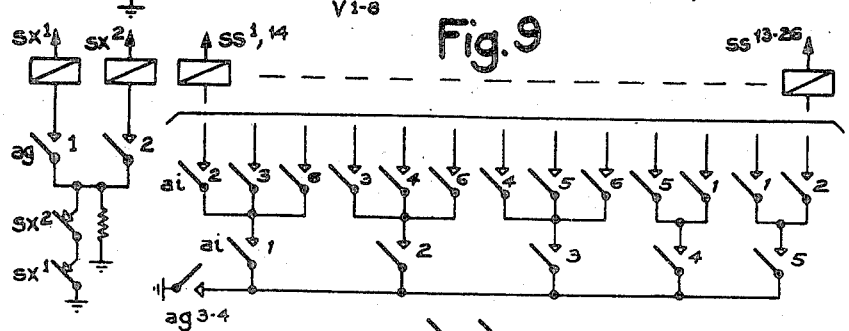
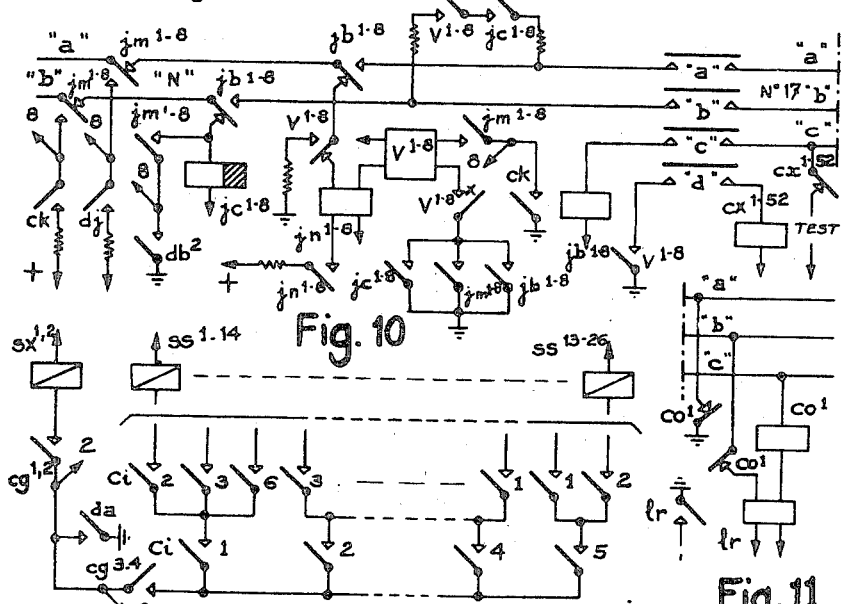
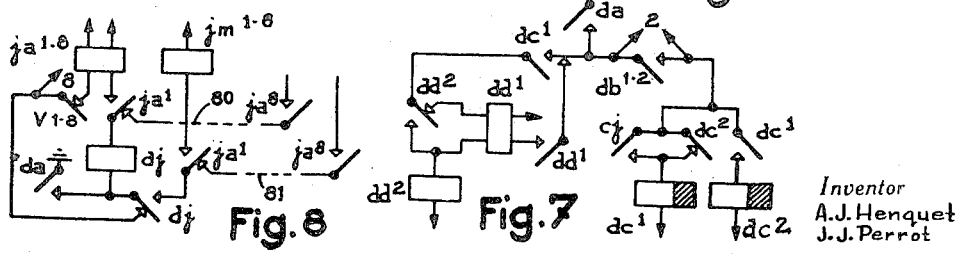

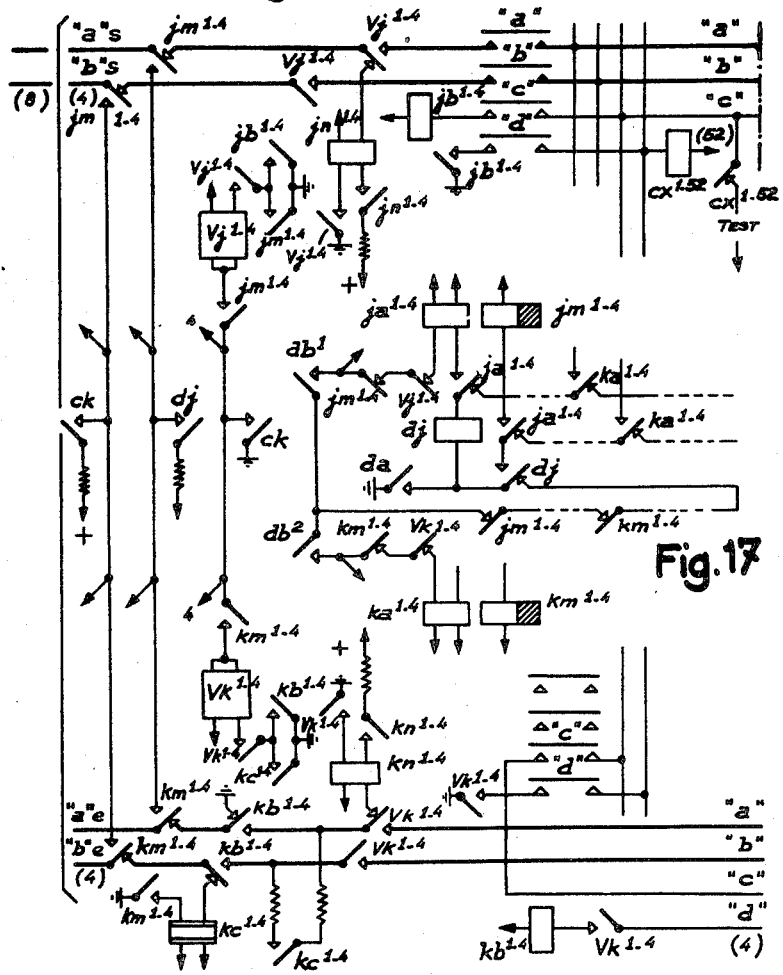
Fig. 18 / Fig. 17
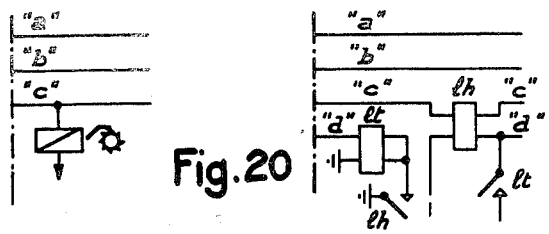
Fig. 19 / Fig. 20

United States Patent Office 2,944,115
Patented July 5, 1960

2,944,115

CONCENTRATORS OF TELEPHONE LINES OR THE LIKE

André Jean Henquet and Jean Jacques Perrot, Boulogne-Billancourt, France, assignors to International Standard Electric Corporation, New York, N.Y., a corporation of Delaware Filed Sept. 27, 1957, Ser. No. 686,662

Claims priority, application France Sept. 28, 1956

7 Claims. (Cl. 179—18)

This invention refers to concentrators of telephone lines or the like, that is, automatic equipments that in the case of telephone systems allow handling a local subscriber group through a small number of telephone lines outgoing from the exchange.

These equipments differ from similar so-called "building satellites" in that they serve larger subscriber groups, through a telephone-line multipling group, with switching means that allow seizing any free line. They comprise a set A near the subscribers, which concentrates the wires (interior or at any rate relatively short) of these subscribers on this multipling group, and a set B, which concentrates the same subscribers on the same multipling group at the exchange. It is particularly a question of outgoing positions on the line finders, used to ring the concentrated subscribers. The incoming positions of these subscribers are further alike in numerous systems as regards the routing of incoming calls, but calling subscribers must nevertheless be identified in order to busy their outgoing positions and operate their meters. It is therefore also a question of concentrating the incoming positions, or at least their control wires (busying and metering).

The concentrator equipments comprise a control device capable of seizing one out of a plurality of incoming or outgoing calls originating at the same time, of seizing a free trunk and of connecting to this trunk (1) the wire of the particular calling or called subscriber involved and (2) that subscriber's position at the exchange. The problem that arises in the concentrators is primarily to provide a dependable control device, as simple as possible and employing few connecting wires between the two sets, because these wires are taken from the telephone-line multipling group and accordingly reduce the number of lines that can serve as trunks for the connections. Moreover, it is desirable that distant set A not comprise an individual supply source but that it be supplied by the exchange, also by means of wires from the same multipling group.

The object of this invention is particularly to provide means and arrangements of means that will allow designing a control device capable of meeting all these requirements and of being used in similar applications. The invention refers particularly to concentrators using cross-bar switches, the horizontal multiples (selecting bars) of which carry the wires or the positions of the subscribers, while their vertical multiples (selectors) carry the trunks. These latter can be used in both directions in certain arrangements or else, in other arrangements, be assigned partly to incoming calls and partly to outgoing calls.

An arrangement in accordance with the invention comprises, in each set, a test device sensitive alike to the incoming calls of all the subscribers and to the outgoing calls to all the subscribers and capable of holding a single call and of identifying the calling or called subscriber in code form, with means for signaling to set B the existence of a call; in set B, an option device, receiving the ringing signals from the two test devices and capable of choosing an outgoing call in order to handle it; a code-sending device, of the remote-controlling and remote-controlled type, with set B as the controlling station and set A as the controlled station, capable as regards incoming calls of recognizing the code set up in set A and of registering it in set B and, for outgoing calls, of sending to set A, in order to have it registered there, the code set up in set B; in each set, a selecting device the positioning of which represents the registering of the code sent; in each set, a connecting device controlled by the set's selecting device to bring about the connection to a trunk, by the set's crossbar switch, of the wire and the position of the subscriber identified by the coding and selecting devices, the connecting device of set B comprising means for first seizing a free trunk and the connecting device of set A being controlled partly by set B and partly by the trunk seized; and means for isolating the wire and the position of the particular subscriber involved from the respective test devices following their connection.

The arrangements in accordance with the invention particularly use a known test device, made up of a series of relay and rectifier matrices. This device holds only one call at a time and neutralizes the others. It identifies the subscribers in the form of multi-element code combinations. For example, for 52 subscribers, a first 4-element matrix defines a 13-subscriber group by means of each element and two other 5- or 6-element matrices identify one subscriber among 13 by means of combinations comprising 2 elements out of 6.

In an arrangement in accordance with the invention, the code sent can be registered each time in both sets by positioning the two selecting devices in accordance with the code set up in the calling set (that is, the set whose call is handled).

The code-sending device particularly uses synchronized-stepping switching means in both sets, controlled by pulses emitted by set B. In accordance with another feature of the invention, the sending device further comprises a code-sending loop, controlled in both sets by the synchronized stepping and showing in each set two paths, one of which is further controlled by the code set up in that set. This loop, closed in set A, is supplied by set B in one direction or the other in passing, in the calling set, over the path controlled by the code set up in that set and over the other path in the other set, so that each selecting device is positioned in accordance with the code formed in the calling set, by pulses whose existence is revealed by that code and whose moment is revealed by the synchronized stepping.

Preferably, the identification or coding devices (comprised in the test devices) and the selecting devices consist of similar relay groups, so that each relay of the coding device positions its corresponding relay in the selecting device through the sending loop.

For the synchronized-stepping switching the arrangements in accordance with the invention particularly employ a known metering-relay chain, controlled by alternate pulses (positive and negative).

In accordance with another feature of the invention, the signal revealing the existence of an incoming call is sent by set A through the closing of a third path of the sending loop in that set and is also received over a third path in set B, whose control device is in normal position. The supplying of this loop in normal position is reversed in set B by the existence of an outgoing call (this constituting the signal revealing such existence) and the current then flows, in set A, over a fourth path, which is independent of the existence of an incoming call. The paths here mentioned are preferably controlled by the normal condition of various devices coming into play in a connection operation, particularly synchronized-stepping relays and selecting bars in crossbar switches.

In accordance with another feature of the invention, the option device comprises a ringing relay, operated by the ringing signal of one set or the other, and two option relays, selectively operated by the ringing relay, the one when there is an outgoing call, in order to handle it (in preference to an incoming call), and the other when there is no outgoing call, in order then to handle an incoming call.

The invention provides arrangements for the particular case where the concentration involves the terminal positions of the subscribers at an exchange where the concentrated subscribers are normally equipped with line circuits and positions on the call finders as also on the line finders. It also provides for the case where the concentration involves only the outgoing positions of the subscribers (on the line finders) with, as regards incoming calls, only the control wires (busying and metering) of the incoming positions. In these latter arrangements, part of the trunks are preferably assigned to outgoing calls, with concentration on these trunks of the outgoing positions, and another part of them is assigned to incoming calls, with extension of these trunks from there to the second call finders but with concentration on them of the control wires (busying and metering) associated with the positions on the line finders. The exchange equipment of concentrated subscribers is then reduced through elimination of the line circuits and the first call finders. On the other hand, the equipment of set B is then supplemented in order to ensure the proper operation of the line finders and of the second finders.

In accordance with another feature out of the invention, the supplying of set A by set B is done by means of alternating current superimposed on the connecting wires of the control device and rectified in set A. A supply loop is provided particularly through the use in one direction of the two wires used for sending the synchronized-stepping pulses and through the use in the other direction of the two wires of the code-sending loop.

The driving of the crossbar switches can be done in a manner known for switches connected together through their vertical multiples. It is done under the control of the respective selecting devices, starting with the switch of set B, upon the reception of the code. This operation comprises the testing and the seizure of a free trunk. The switch of set A is controlled with the aid of the trunk seized, without supplementary connecting wires.

Other features and advantages of this invention will become apparent from the following description of embodiment examples with reference to the accompanying drawing, wherein:

Fig. 7 shows the pulse-rate device provided in set B.

Fig. 8 shows the trunk-testing device provided in set B.

Fig. 9 shows the switch equipment, its connections and its selector and selecting-bar magnets in set A.

Fig. 10 shows the corresponding equipment in set B.

Fig. 11 shows the assumed equipment of a line circuit at the exchange, connected to set B.

Fig. 17 shows a trunk-testing device similar to the one shown in Fig. 8, intended for another variant, where the subscribers do not have incoming positions at the exchange and the trunks are assigned to the calls, either incoming or outgoing.

Fig. 18 shows the corresponding equipment of the switch, its connections and its selector magnets in set B, similar to the top portion of Fig. 10.

Fig. 19 shows the assumed equipment of an incoming position, with the meter.

Fig. 20 shows the assumed equipment of an incoming trunk, replacing a first finder circuit vis-a-vis the exchange's second finders.

Figure 1:
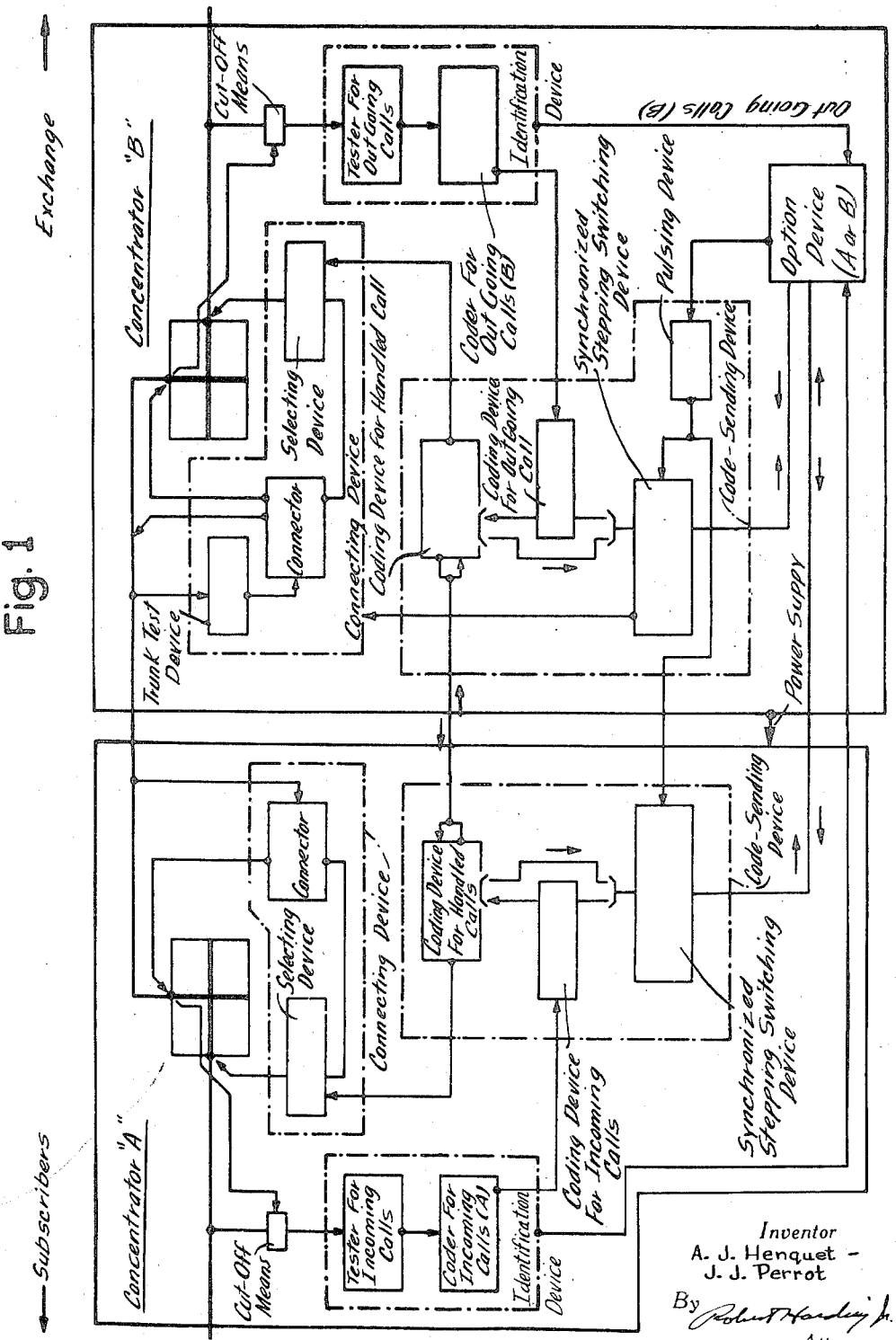
Fig. 1 shows schematically a concentrator arrangement in accordance with the invention, with connection to the terminal positions.

The concentrator installation shown in Fig. 1 connects fifty subscribers to their terminal positions at the exchange by means for example of 8 telephone lines used as two-way trunks. In each concentrator a crossbar switch provides the necessary switching between the subscribers' wires or positions, connected to its horizontal multiples, and the trunks, connected to its vertical multiples. The operations whereby a calling or called subscriber is connected to his position at the exchange are controlled by a control device whose functions and component devices will be described later.

In both sets, A and B, each subscriber line is connected, by individual cut-off means, to a test and identification device. This device tests all calls occurring and confirms the testing of one of these calls, which is thus held. The relays or other means of confirmation identify the held call in code form, that is, they code the call. The existence of a held call, regardless of its nature, is signaled by the two devices to an option device comprised in set B and that chooses the call to be handled, as between an incoming call signaled by set A and an outgoing call signaled by set B. It will be seen later on that the call signals are controlled by the normal position of a series of components of the control device, as also of the selecting bars of the crossbar switches. Consequently, as soon as the option device begins a connection operation, it is cut off from call signals for the duration of that operation.

The option device starts a code-sending device. The latter must position, in accordance with the code set up in the calling set, selecting devices that will control, each in its own set, the driving of the bars of the crossbar switches. In the variant here shown, each set comprises a selecting device that can be positioned either as required by the call-coding device of that same set, when that set is the one whose call is handled, or as required by the coding device of the other set, in the opposite case. The code sent from one set is therefore registered in both sets by the positioning of their selecting devices.

The sending device comprises, in each set, a synchronized-stepping switching device operated by pulses sent from set B and a coding device for the call handled, which registers the code sent either from the same set or from the other and which constitutes said selecting device.

It will be assumed first that an incoming call A is handled. The option device starts the pulsing device, which causes the synchronized stepping of the switching devices in both sets, so as to define consecutive moments. At the same time, the option device feeds a code-sending loop in direction A. Still in direction A, this loop continues over a connecting wire to set A, where it crosses the synchronized-stepping device and takes a path that then crosses the incoming-call coding device, which is a routing positioned with the identification coding (sic Translator). The loop thereupon passes into the coding device of the call handled, returns over a connecting wire to set B and passes into the coding device of this set. From this device it takes a path that leads directly to the synchronized-stepping device of set B. The loop crosses this device and returns to the option device. It will be understood that in the stepping, code and coding devices the loop comprises a series of branches, one for each moment. There is for each moment a relay or other receiving element in the coding device. In set A, these branches are controlled, the stepping aside, by the code device. In both sets, the corresponding relays or other coding elements are switched in at the same moments by the respective synchronized devices. The corresponding relays are operated at the moments determined by the code device of set A, this operation constituting the coding of the call handled. It will be seen later on that the handled-call code is the same or about the same as the identified-call code, so that the control of the handled-call coding device by that of an identified call can be done by simple means.

If it is assumed now that an outgoing call is handled, the option device feeds the code-sending loop in the other direction B. The loop then takes in set B a path passing through the outgoing-call code set up by the identification device and in set A a path leading directly from the handled-call coding device to the synchronized device, without passing through an incoming-call code. The two handled-call coding devices are thus positioned in accordance with the code of the outgoing call that is handled in this case.

After the code sending, a connecting device is started in set B (by the ending of the synchronized stepping). It is a question of a device known in principle, which is adapted to its application to the concentrator particularly by the fact that the selecting device controlling the choice of a selecting bar consists of the code device positioned by the handled-call coding device, such as a routing switch formed by the contacts of the coding relays. The connecting device tests the trunks in order to seize a free trunk and drives the switch, namely, first the selecting bars, under the control of the handled-call code, and then the selector of the seized trunk.

For the trunk, the connecting device of set B starts the connecting device of set A, which has only a connecting function, namely, the driving of the selecting bars under the control of the handled-call code and then of the selector of the calling trunk.

The cut-off devices are then operated in both sets in order to cut the line off from the test devices. Further, certain secondary operations are performed for the transfer of the subscriber's loop and of its supply.

The control device then homes and is ready to handle another call. The switch selectors and the cut-off relays release at the end of the call.

In another arrangement in accordance with the invention the identification devices are used as selecting devices. Upon the sending of the code from the calling set to the other, the code set up by the calling set's identification device is registered by the other set's identification device. Particularly, in a variant of the above-mentioned sending device, this other set's identification device is positioned by pulses flowing into the code-sending loop under the control of the calling set's identification device.

Figure 2:
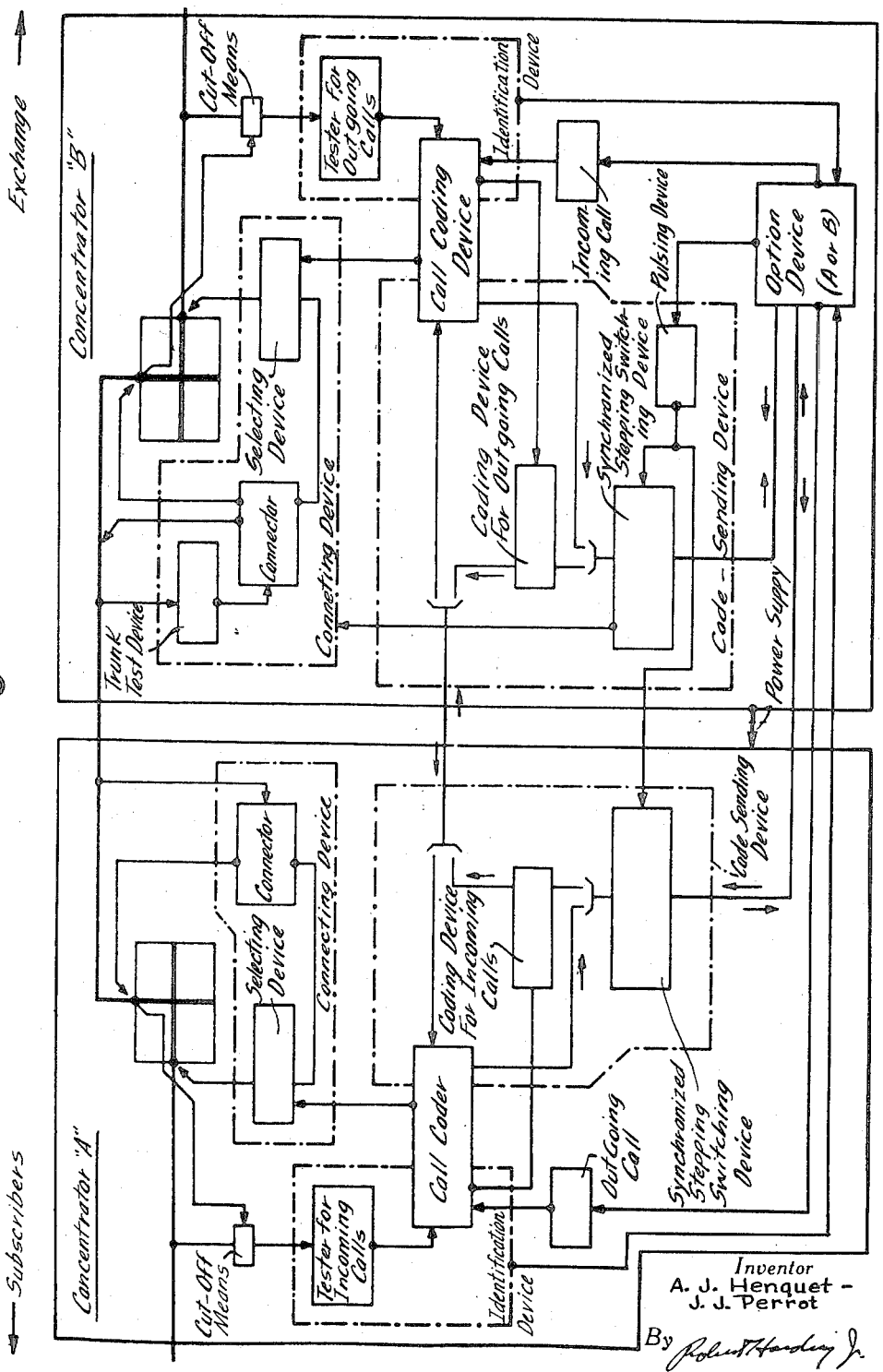
Fig. 2 shows schematically another arrangement in the same case.

Fig. 2 shows the above arrangement. The general layout and the test and identification devices, as well as the option device, are in principle the same as in Fig. 1. However, the option device signals its choice to the sets, particularly to set A, that an outgoing call is going to be handled and to set B that an incoming call is going to be handled, as the case may be. The sending of an incoming-call signal to set B poses no problem. The sending of an outgoing-call signal to set A calls for a supplementary connection between the sets, which must be provided without adding wires. For this purpose, use can be made for example of the fourth path, mentioned above, of the sending loop in set A, which the option device supplies in the case of an outgoing call. This path can comprise a relay or other device operated in this case, such operation representing the desired signal. Or else use can be made of the synchronized-stepping device, when it is driven by pulses of alternate signs, as mentioned above. Assuming that the first stepping pulse is positive, it can be made, in the case of an outgoing call, to come after a negative pulse, which will not affect the synchronized-stepping device and which will represent the desired signal.

The sending device comprises the same synchronized-switching device and, as has been shown, uses the other set's identification-coding device to register in that other device the code sent from the calling set. In the above-mentioned test device it has been seen that the call held neutralized all other existing calls. In this device, any call positively held would neutralize all other calls. The registering of the code sent in this arrangement can be effected by applying the code signals as a fictitious call from the subscriber held in the calling set to the test device of the other set. This test device then identifies that call on its own coding device, replacing it, if necessary, with a previously-held actual call. Particularly, the code pulses, controlled in the calling set by the stepping and coding devices of this set, can operate in the other set a relay supplying local pulses, controlled by this other set's stepping device in order to be applied to the corresponding inputs of the test device.

It will be assumed first that an incoming call A is handled. The option device sends set B an incoming-call signal and starts the pulsing device and, through this device, the two stepping devices. At the same time, the option device feeds the code-sending loop in direction A. Still in direction A, this loop, after having reached set A and having crossed its stepping device, takes a path that crosses the incoming-call coding device and returns directly (over a common wire) to set B. In this set, the loop takes a path that leads to the coding device, then it crosses the stepping device and returns at its other end to the option device feeding it. The coding device of set B, which is normally positioned to identify a held call present in set B, is now positioned in accordance with a held call present in set A, which is then handled. In the case of a local-pulse relay, the loop's return path A in set B can comprise this relay, instead of going to the coding device, and the pulses of this relay can cross the stepping device and then go to the coding device. Further, other equivalent circuits can be provided for the sending loop, in this arrangement as in that shown in Fig. 1 and in other arrangements in accordance with the invention. For example, in the case of direction A, the sending loop can cross the stepping device at the output of set A and at the input of set B, instead of the input of set A and of the final portion of the loop in set B, as shown in Figs. 1 and 2.

If it is now assumed that an outgoing call is handled, the option device sends an outgoing-call signal to set A and feeds the code-sending loop in the other direction B. It is then the coding device of set A that is positioned in accordance with that of set B.

After the code sending, the connection operations are performed as in the arrangement of Fig. 1, it being understood that the selecting device that controls the driving of the crossbar switch is a code device associated with the same coding device as the code device that controls the code sending (switchings set up by two contact groups of the same relay set).

Figure 3:
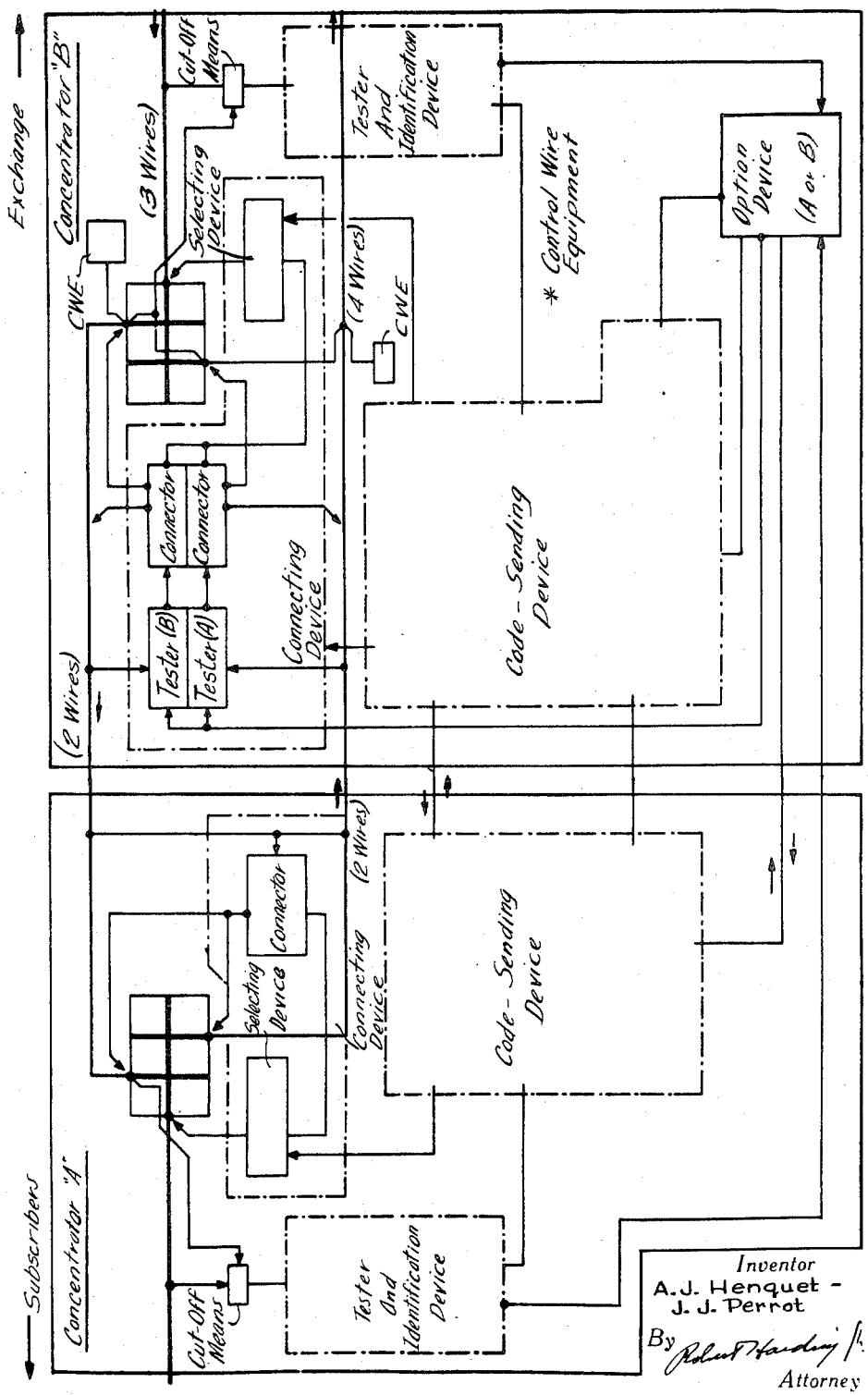
Fig. 3 shows schematically another arrangement, with connection to the second call finders.

The installation shown in Fig. 3 connects the subscribers to their outgoing positions at the exchange. For incoming calls, the trunks are extended directly to the second call finders. The subscribers do not have incoming positions properly so called (wires "a—b") but when there is an incoming call the subscriber is connected to the (busy and metering) control wires associated with his outgoing position. The trunks are here assigned in part to incoming and in part to outgoing calls.

The connecting device that comes into play after the code sending is partly in duplicate. Depending upon whether the call handled is an incoming or an outgoing call, it must seize a trunk belonging to one group or the other. Set B therefore comprises a dual trunk-testing device, whose portion A or portion B comes into play depending upon the type of call, incoming or outgoing, that the option device has chosen to handle. The connecting means, likewise in duplicate, act upon the corresponding selectors of the switch of set B and drive the connecting device of set A over the corresponding trunks. The connecting device of set A also drives two selector sets but without making any distinction between them, because its operation no longer depends, as is the preceding arrangements, upon the type of call handled. The driving of the selecting bars, which in each set precedes the driving of the selectors and which is controlled by the selection code positioned in that set, does not depend upon the type of call handled, in one set or the other.

The connection of an outgoing call in set B entails the connection of a piece of equipment to the control wires of the outgoing position, for example the connection of a holding relay to the "c" wire. The connection of an incoming call also entails the connection of a piece of equipment to the control wires leading to the second finders and, moreover, a strapping between these wires and those of the calling-subscriber's outgoing position, in order to busy that position and have access to the meter. It will be understood that in the absence of incoming positions the meters will be associated with the outgoing positions, even if they are used for incoming calls. At any rate, cut-off means are provided, as in the preceding arrangements, to cut the connected-subscriber's position or wire from the call-test device in both sets.

In all these arrangements, suitable connecting devices, not shown in Figs. 1 to 3, such as contacts, temporary loops and supply bridges, etc., can be inserted at suitable points of the trunks to provide for any necessary gating, so as to extend the connections under proper conditions.

A variant (Figs. 4 to 11) will be described below as an embodiment example of Fig. 1.

Figure 4:
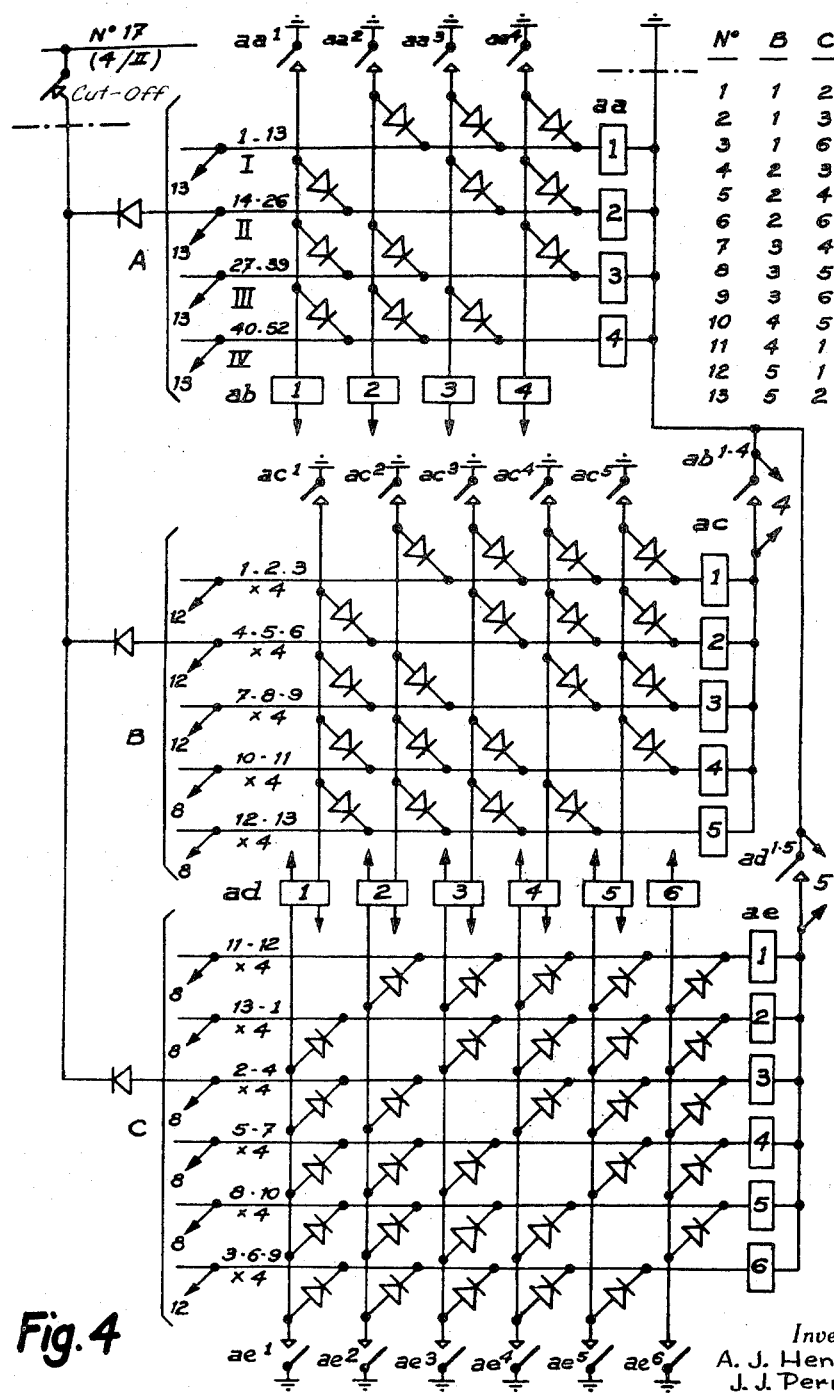
Fig. 4 shows a matrix testing device for the calls.

A call test and identification device is shown in Fig. 4. It is adapted to the make-up of crossbar switches of the type whose use is contemplated in this embodiment example. Switches of this type comprise 13 selecting bars capable of being placed in one direction or the other by means of $13 \times 2 = 26$ magnets. A 14th bar is used for dividing, different connections being established depending upon whether it is placed in one direction or the other by means of its 2 magnets. Thus are obtained $13 \times 2 \times 2 = 52$ different connections. The selectors will be assumed to be 8 in number, so that a multiplying group of 8 trunks will be available between concentrators A and B.

The present embodiment example uses the full capacity of these switches and allows connecting up to 52 lines. These lines are divided into 4 groups of 13. Groups 1 and 2 are connected in one position of the dividing bar, and groups 3 and 4 in the other. Groups 1 and 3 are connected by placing the 13 bars in one direction by means of the first group of 13 magnets and groups 2 and 4 by placing them in the other direction by means of the second group of 13 magnets, in accordance with the following table:

| Group | Lines | Bars | Magnets | Dividing Magnet |
|---|---|---|---|---|
| 1 | 1–13 | 1–13 | 1–13 | 1 |
| 2 | 14–26 | 1–13 | 14–26 | 1 |
| 3 | 27–39 | 1–13 | 1–13 | 2 |
| 4 | 40–52 | 1–13 | 14–26 | 2 |

Each line is connected in normal position, with a cut-off device whose details will be given later, to a test wire multipled to three matrices, with decoupling rectifiers. In Fig. 4 it is assumed that this is line No. 17, that is, the No. 4 line in group 2. The first matrix A has four inputs, each input being multipled to the 13 test wires of the corresponding group. This matrix identifies the four groups by means of four relays, one for each group.

The identification of the 13 lines of any group is effected by two other matrices, namely, 5-input matrix B and 6-input matrix C, by means of six relays, two for each line, in accordance with the following table:

| Line | 1 | 2 | 3 | 4 | 5 | 6 | 7 | 8 | 9 | 10 | 11 | 12 | 13 |
|---|---|---|---|---|---|---|---|---|---|---|---|---|---|
| Relay positioned by (B) | 1 | 1 | 1 | 2 | 2 | 2 | 3 | 3 | 3 | 4 | 4 | 5 | 5 |
| Relay positioned by (C) | 2 | 3 | 6 | 3 | 4 | 6 | 4 | 5 | 6 | 5 | 1 | 1 | 2 |

In normal position, test relays aa of matrix A are supplied, for example by a ground if the line wires used for the test are connected to the battery, or vice versa. It will be assumed that lines 4, 17, 18 and 39 are calling. Relays aa–1, 2, 3 energize. Relay aa–1 applies a ground to a cross wire multipled to the corresponding identification relay ab–1 and to the other three test wires. Relays aa–2, 3 operate similarly and all the relays aa de-energize, then operate again, etc. One of the relays ends up by holding and keeps the others unoperated. It will be assumed that this is relay aa–2, corresponding to lines 17 and 18. The corresponding relay ab–2 is operated.

Matrix B is supplied by a contact of relays ab–1–4 and is therefore now supplied by the contact of relay ab–2. The test wires of groups 1, 3 and 4 have been grounded by matrix A. Wires 17 and 18, that is, No. 4 and 5 of group 2, are connected to the second input of matrix B and cause the operation of relays ac–2 and ad–2. Relay ac–2 applies a ground to the other four inputs of the matrix.

Matrix C is supplied by a contact of relays ad–1–5 and is therefore now supplied by the contact of relay ad–2. Wires No. 4 and 5 of all the groups are respectively connected to the third and fourth inputs of matrix C. Relays ae–3–4 operate, cause each other to release, etc. It will be assumed that relay ae–3 holds. Relay ad–3 operates. The combination ab–2, ad–2, 3 identifies line 17.

If the test supply is in the opposite direction, as is the case for outgoing calls, where the test is on the "c" wire grounded by the call, the matrices are supplied by batteries (test relays and identification relays) and the rectifiers are connected in the opposite direction.

Figure 5:
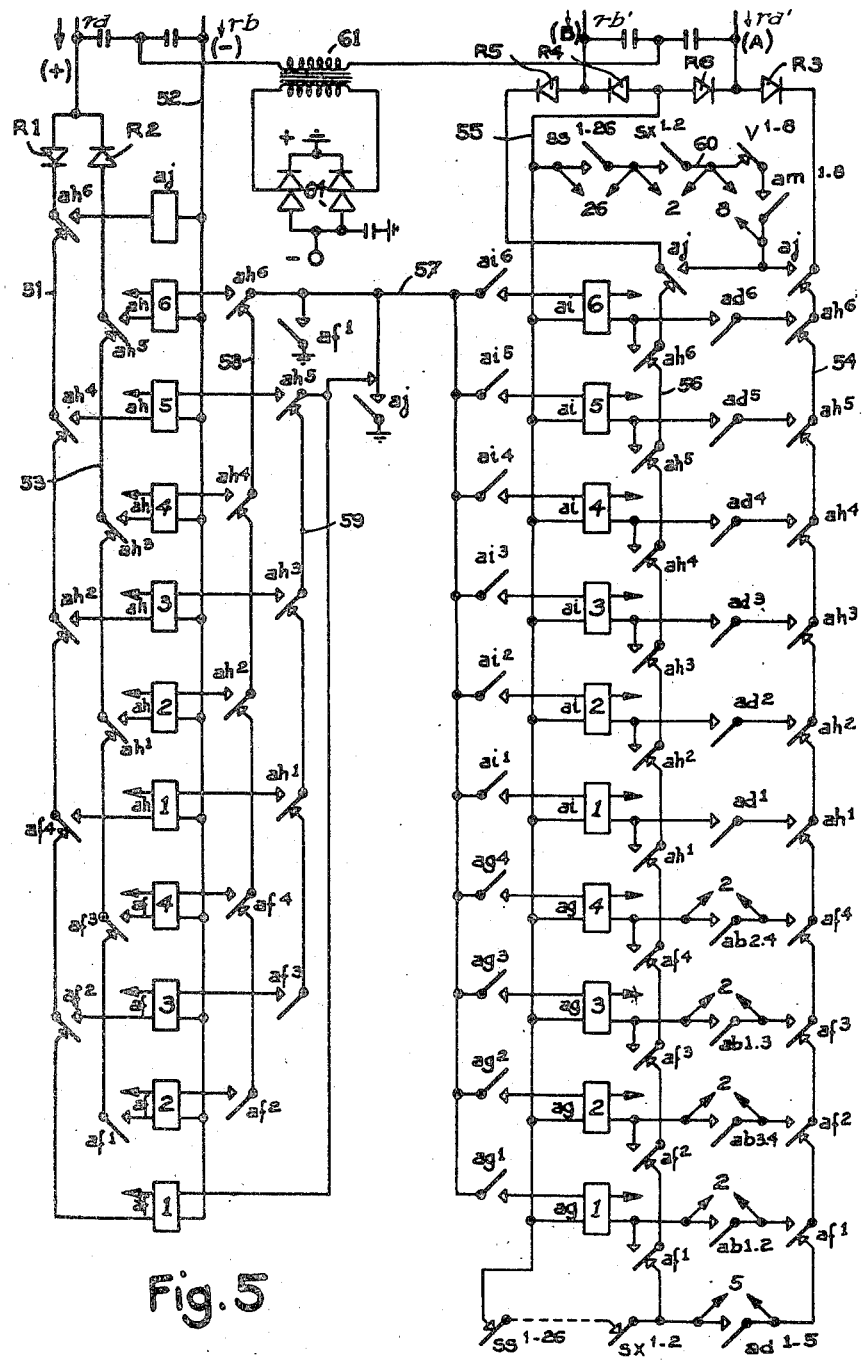
Fig. 5 shows the synchronized-stepping and code-sending chains in set A.

Referring to Fig. 5, the sending device in set A comprises a synchronized-stepping chain, connected to set B by a two-wire line ta—tb, and a code-sending chain, also connected to set B by a two-wire line ta'—tb'.

The stepping chain comprises four relays af–1–4, corresponding to identification relays ab–1–4 of Fig. 4; six relays ah–1–6, corresponding to relays ad–1–6, and one supervisory relay aj. It comprises two paths: the first is for the positive pulses and uses wire ta, rectifier R1, contact chain 51, the relays and return wire 52 connected directly to wire tb; the second is for the negative pulses and uses wires tb and 52, the relays, contact chain 53, rectifier R2 and wire ta.

The sending chain comprises four relays ag-1-4, corresponding to relays ab and af (with a translation, however, as will be explained later), and six relays ai, corresponding to relays ad and ah. It also comprises two paths: the first is for the positive supply (incoming calls) and uses wire ta', rectifier R3, contact chain 54, the relays in passing through the front contacts of the corresponding identification relays, return wire 55, rectifier R4 and wire tb'; the second is for the negative supply (outgoing calls) and uses wire tb'; rectifier R5, contact chain 56, the relays, return wire 55, rectifier R6 and wire ta'. Further, a third path is set up at the end of the first by a shunt controlled in parallel by the front contacts of relays ad-1-5 and then in series by the back contacts of selecting-bar magnets SS-1-26 and of dividing-bar magnets SX-1-2; and a fourth path is set up at the end of the second, passing through the final portion of the third, controlled only by the back contacts of the magnets.

The sending line is supplied continuously in the positive direction (arrow A) in readiness for an incoming call. When an incoming call is identified the loop is closed over the third path: wire ta', rectifier R3, chain 54, back aj, ah-6-1, af-4-1, front of one of relays ad-1-5 in matrix B (Fig. 4), back of magnets SX-1-2 and SS-1-26, return wire 55, rectifier R4, wire tb'. This loop constitutes the incoming-call signal sent by set A to set B.

As a result of that signal, set B holds the positive feeding of the sending line and sends eleven stepping pulses, alternately positive and negative, to line ta—tb. The first pulse (positive) operates relay af-1: wire ta, rectifier R1, chain 51 (back contacts of relays ah-6, 4, 2, af-4, 2), af(I)-1, return wire 52, wire tb. Over a front contact, relay af-1 applies a ground to locking wire 57 and holds on this ground: ground, t-af-1, wire 57, r-aj, af(II)-1, battery. The second pulse (negative) operates relay af-2; wire tb, wire 52, af(I)-2, t-af-1, chain 53 (back contacts of relays af-3, ah-1, 3, 5), rectifier R2, wire ta. The third pulse (again positive) will operate relay af-3 over t-af-2, etc. The last (also positive) will operate relay aj over t-ah-6.

The even relays are locked over wire 57 by locking-contact chain 58. The odd relays are locked over wire 57 by locking-contact chain 59 and r-aj. Each relay of a parity, upon locking, cuts off the rest of the locking chain and causes the preceding relay of the same parity to fall back. When finally relay aj operates, it doubles the ground on wire 57 and breaks the locking chain of the odd relays, as also the locking of relay af-1. Relay ah-6 holds over its locking winding, and relay aj is held by the current that set B sends to line ta—tb without changing sign, up till the end of the connection.

The operation of each relay of the stepping chain switches contact chain 54 to the corresponding relay of the sending chain. Owing to the identification, one of relays ab and two of relays ad are operated, namely, ab-2 and ad-2, 3 in the above-described example. Were there no translation, relay ag-2 would operate over t-af-2, t-ab-2 upon the operation of relay af-2. The translation between the identification code (relays ab-1-4) and the selection code (relays ag-1-4) is as follows:

| Group | Trunks | Indentif. | Magnets | Div. Mag. | Selection |
|---|---|---|---|---|---|
| 1 | 1-13 | ab-1 | 1-13 | 1 | ag-1, 3 |
| 2 | 14-26 | ab-2 | 14-26 | 1 | ag-1, 4 |
| 3 | 27-39 | ab-3 | 1-13 | 2 | ag-2, 3 |
| 4 | 40-52 | ab-4 | 14-26 | 2 | ag-2, 4 |

For this translation, relays ag-1-4 are controlled by relays ab-1-4 as follows:

ag-1 by t-ab-1, 2; ag-2 by t-ab-3, 4
ag-3 by t-ab-1, 3; ag-4 by t-ab-2, 4

Relay ag-1 is therefore operated upon the operation of relay af-1 by t-af-1, t-ab-2, and relay ag-4 is operated upon the operation of relay af-4 by t-af-4, t-ab-2. Thereupon, relay ai-2 is operated upon the operation of relay ah-2 by t-ah-2, t-ad-2, and relay ai-3 is operated upon the operation of relay ah-3 by t-ah-3, t-ad-3.

Selecting relays ag and ai are locked over their locking winding and their locking contact on locking wire 57 up till the end of the connection.

The operating current of each selecting relay, which lasts from the operation of the corresponding stepping relay up to the operation of the next stepping relay, is a pulse whose moment is defined by the stepping pulse, something that allows the equipment of set B to determine which selecting relays have operated in set A and consequently the identity of the calling line. It will be seen later on that this determination is effected very simply, by means of two chains similar to the ones contained in set A.

After the operation of relay aj, line ta'—tb' is directed by this relay to a fifth path, consisting of a chain 60 comprising front contacts associated with selecting-bar magnets SS-1-26 and SX-1-2, front contacts am-1-8 corresponding to the selector magnets, and, in series with each of these latter contacts, back contacts V-1-8 associated with these magnets. This fifth path is closed after the positioning of the selecting bars and relays am, which prepare the selectors, making sure that the corresponding selector is actually in normal position. The closing of this loop represents a signal for set B, which then operates the prepared selector.

In the case of an outgoing call, set B reverses the feeding of sending line ta'—tb'. This latter then shows a loop over the fourth path, which does not depend on an incoming call: wire tb', rectifier R5, chain 56 (r-aj, r-ah-6-1, r-af-4-1), r-SX-1-2, r-SS-1-26, return wire 55, R6, wire ta'. This loop checks only that the selecting bars are actually in home position. Set B does not maintain the negative feeding of line ta'—tb' but sends stepping pulses as in the case of an incoming call and sends (negative) pulses over the sending line at moments defining the called-line's selection code. Thus, to ring line 17, code pulses are sent at moments 1, 4, 6 and 7, that is, upon the operation of relays af-1, 4 and ah-2-3. Over chain 56, these pulses operate the corresponding relays ag-1, 4 and ai-2, 3, which lock as before. After the operation of relay aj, the same fifth path appears over the sending line but this time through rectifiers R5 and R6 and the contact aj belonging to chain 56.

Fig. 5 shows the feeding device of concentrator A: the alternating current is sent from set B over the two wires ta—tb in parallel and the two wires ta'—tb' in parallel. It is received at transformer 61, connected to the wire pairs by condenser bridges 62—63. A complete rectifier 64 is supplied by transformer 61. Its positive pole is grounded and its negative pole supplies the "battery" side of the relays and magnets.

Figure 6:
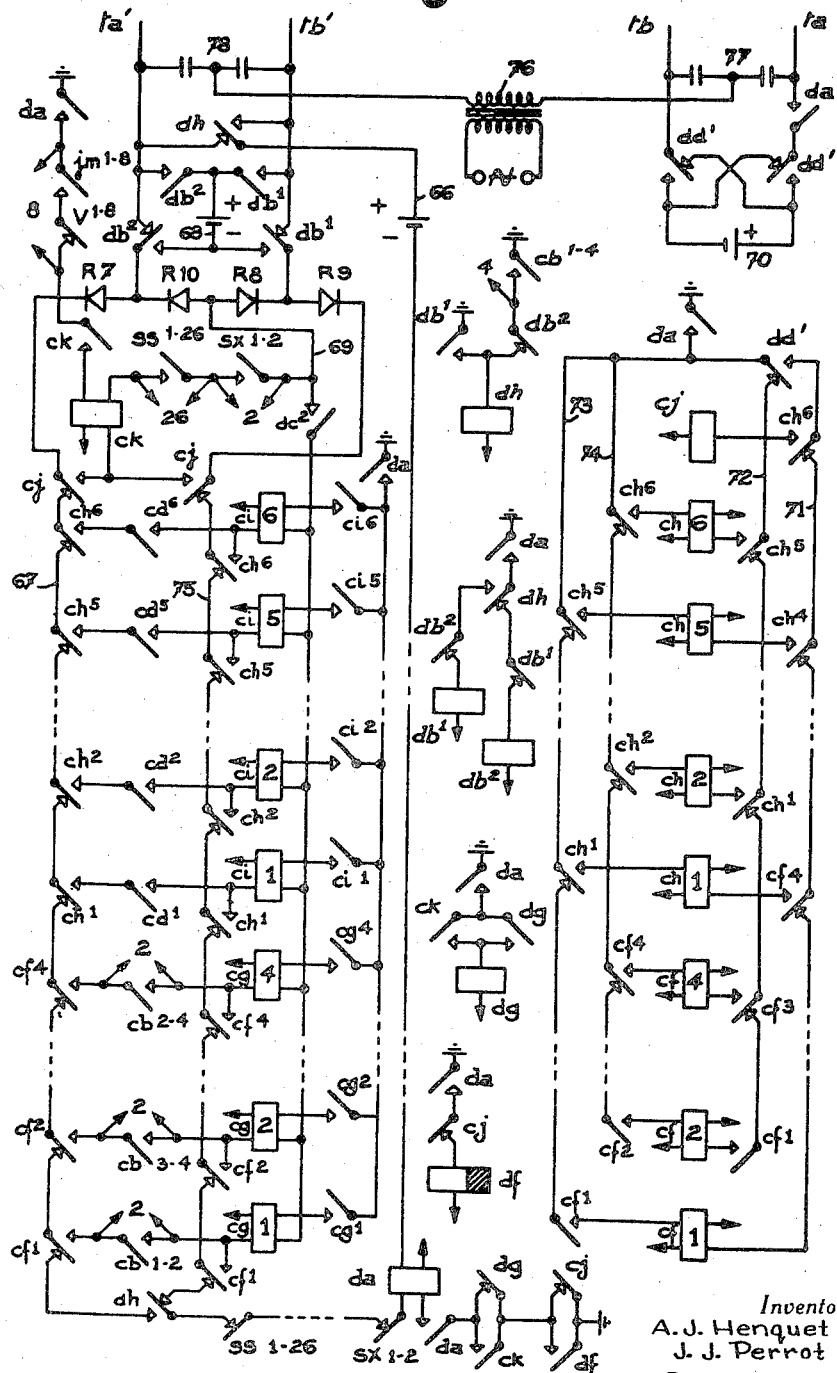
Fig. 6 shows the corresponding chains of set B, the option relays and a few auxiliary relays.

Referring to Fig. 6, the sending device contained in set B comprises a synchronized-stepping chain, a device feeding alternate pulses of the stepping chain of set A over line ta—tb, a code-sending chain connected to the same wires ta'—tb' as that of set A and a feeding bridge supplying these two chains in one direction or the other. With this sending device are associated the ringing device, with its separate battery, the option device and a supervisory device for the connection.

An outgoing call operates relay dh over the front contact of one of the first four identification relays cb-1-4, similar to relays ab-1-4 of Fig. 4, and the back contact of a relay db-2. The ringing loop (4th path) of set A is then supplied in series with the ringing loop (3rd path) of set B as follows: positive pole of separate battery 66, t-dh, wire tb', loop in set A, wire ta', r-db-2, rectifier R7, contact chain 67, t-dh, checking chain of magnets r-SS-1-26, r-SX-1-2, relay da(I), negative pole of battery 66. If the control devices of set A are in normal position, as they should be, the loop is closed and relay *da* operates and locks for the duration of the connection: ground, *r-cj*, *r-dg*, *t-da*, *da*(II), battery.

Relay *da* operates, for supervisory purposes, a slow-releasing relay *df*: ground, *t-da*, *r-cj*, *df*, battery. Relay *df* will release with a time lag upon the operation of relay *cj* and during this time lag relay *da* will remain locked by ground, *t-df*, etc.

For the option as to the call to be handled, relay *da*, having operated for an outgoing call, with *dh* operated, operates outgoing-call relay *db-1* over ground, *t-da*, *t-dh*, *r-db-2*, *db-1*, battery. Incoming-call relay *db-2* is cut off over a back contact of relay *dh*; the outgoing call will therefore be handled even if an incoming call has developed between the operation of relays *dh* and *db-1*. Relay *db-1* holds relay *dh* over ground, *t-db-1*, *dh*, so that the sending of the code will not be wrong should the incoming call disappear during the sending.

The operation of the relay prepares the supplying of the sending chain in the negative direction with the separate sending battery: positive pole of battery 68, *t-db-1*, wire *tb'*, loop in set A, wire *ta'*, *r-db-2*, R7, chain 67, break at the end of this chain, which for the moment is connected to the third path, coding relay, return wire 69, rectifier R8, *t-db-1*, negative pole of battery 68.

Referring to Fig. 7, relay *da* starts the pulse-rate device. Slow-releasing relay *dc-1* is operated over ground, *t-da*, *t-db-1*, *r-dc-2*. Slow relay *dc-2* is operated thereupon over the same ground and *t-dc-1*. Relay *dc-2* cuts off relay *dc-1*, which releases. Relay *dc-2* releases in turn and the cycle recommences. Each complete cycle of relays *dc-1-2* corresponds to one pulse, positive or negative. When relay *dc-1* operates the first time, relay *dd-1* is operated over ground, *t-da*, *t-dc-1*, *r-dd-2*, *dd*(I)-1, battery. When relay *dc-1* releases, relay *dd-1* holds in series with *dd-2*, which operates: ground, *t-da*, *r-dc-1*, *t-dd-1*, *dd*(II)-1, *dd-2*, battery. On the second energization of relay *dc-1*, relay *dd-2* holds without going through relay *dd-1*, which releases: ground, *t-da*, *t-dc-1*, *t-dd-2*, *dd-2*, battery. When relay *dc-1* releases, relay *dd-2* releases with it. On the third energization of relay *dc-1*, relay *dd-1* operates again, and so forth.

Referring back to Fig. 6, between the operation of relays *da* and *dd-1* the stepping chain of set A (line *ta-tb*) is supplied in the negative direction, without any effect on this chain: positive pole of separate battery 70, *r-dd-1*, wire *tb* . . . wire *ta*, *t-da*, *r-dd-1*, negative pole of battery 70. Thus a negative pulse will be sent during each unoperated period of relay *dd-1*. Positive pulses are sent during the operating periods of this relay: positive pole of battery 70, *t-dd-1*, wire *ta* . . . wire *tb*, *t-dd-1*, negative pole of battery 70.

The synchronized-stepping chain of set B is like the one of set A: relays *cf-1-4*, *ch-1-6* and *cj*, respectively corresponding to relays *af*, *ah* and *aj*; the first path comprises contact chain 71 and the odd relays (and relay *cj*) to battery; the second path comprises contact chain 72 and the even relays to battery. However, the supplying of this chain and the locking of its relays are simplified. The switching between the two paths is effected directly by an inverter of relay *dd-1*: ground, *t-da*, *t-dd-1*, chain 71; same ground, *r-dd-1*, chain 72. The relays lock on the same ground controlled by the front contact of relay *da*, the odd relays over chain 73 and the even relays over chain 74.

Upon the operation of relay *cj* on the eleventh pulse (positive pulse supplied by the sixth energization of relay *dd-1*), relay *dc-1* (Fig. 7) holds over *t-cj* and holds relay *dd-1* operated under the control of relay *da* (as also relay *dc-2*). Relay *cj* (Fig. 6) holds: ground, *t-da*, *t-dd-1*, *t-ch-6*, *cj*, battery (its operating circuit); relays *ch-5*, *6* remain locked under the control of relay *da*. Line *ta—tb* continues to be supplied in the positive direction, thus holding relay *aj* (Fig. 5) in set A.

The code-sending chain is exactly like that of set A: coding relays *cg-1-4* and *ci-1-6*; first path (for outgoing calls) over rectifier R7, stepping-contact chain 67, identification contacts *t-cb-1-4* and *t-cd-1-6*, the coding relays, return wire 69 and rectifier R8; second path (for incoming calls) over rectifier R9, stepping-contact chain 75, the coding relays, the same return wire and rectifier R10. The return wire is controlled by a front contact of relay *dc-2* (*t-dc-2*); thus the pulses start in the sending chain some time after (the operating time of relay *dc-2*) the pulses in the stepping chain and end some time before (the operating time of relay *dc-1*, Fig. 7), thereby ensuring at each moment of the stepping the operation of only the corresponding coding relay after the switching effected by the corresponding stepping relay in the stepping chains of the two sets.

The third path (outgoing-call signal), at the end of the first, has already been described. The fourth path (incoming-call signal) is the same as the third in its operative portion: rectifier R9, chain 75 terminated by *r-cf-1*, *r-dh*, checking chain SS-1-26 and SX-1-2, *da* (I), battery 66, *r-dh*. The fifth path (supervision), prepared by the operation of relay *cj*, comprises relay *ck* (I), front contacts associated with magnets SS-1-26, in parallel, and front contacts associated with magnets SX-1-2, in parallel. Relay *ck* operates upon the operation of relay *cj* after the operation of a selecting bar and of the separating bar in the two sets and when a selecting magnet has been chosen in set A (operation of relay *am*, Fig. 9). It locks over a circuit prepared when a selector magnet has been seized but not yet operated: ground, *t-da*, *t-jm-1-8*, each in series with the back contact of the corresponding magnet *r-V-1-8*, *t-ck*, *ck* (II), battery.

Upon the operation of relay *cj*, relay *df* releases slowly, as already stated. Upon the operation of relay *ck*, relay *dg* operates over: ground, *t-da*, *t-ck*, *dg*, battery, and locks over: ground, *t-da*, *t-dg*, *dg*, battery. Relay *da* holds over ground, *t-df*, *t-ck*, *t-da*, *da* (II), battery. When relay *ck* releases after the connection (magnets V operated in both sets), relay *da* releases and causes the release of all the relays mentioned, as also of the selecting-bar magnets. It also breaks the stepping line and the code-sending line, thereby causing the release of supervision relay *aj* (Fig. 5) and of the other relays mentioned, as also of the selecting-bar magnets in set A.

However, if the connection operations are not performed quickly after the operation of relay *cj*, relay *df* releases meantime and cuts off relay *da*, which falls back and cancels the preceding operations in order to handle the same call again, or some other call, depending upon the circumstances.

Returning now to the case of an outgoing call, the option device has operated and the pulse-rate device has been started as stated above. On the first pulse (positive, pulling up of relay *dd-1*), relay *cf-1* operates in set B at the same time as relay *af-1* in set A. The call-signal path is broken in both sets and the code-sending path is set up as follows: positive pole of battery 68, *t-db-1*, wire *tb'*, second path in set A, wire *ta'*, *r-db-2*, first path in set B (rectifier R7, chain 67 . . . wire 69, rectifier R8), *t-db-1*, negative pole of battery 68. The current flows at the moments defined by the stepping (chain 67, Fig. 6, and chain 56, Fig. 5) for which identification contacts *t-cb-1-4*, *t-cd-1-6* are closed, and the corresponding selecting relays (*cg, ci, ag, ai*) are positioned simultaneously.

At the end of the stepping, relays *cj* and *aj* operate and prepare the fifth path in both sets. Relay *ck* will operate when this path is closed by the operation of a selecting-bar magnet and a dividing-bar magnet in both sets and by the operation of a preparation relay *am-1-8*, the corresponding selector magnet V-1-8 being in home position, in set A (Fig. 5).

Where an incoming call is identified in set A while there is no outgoing call in set B and its relay *dh* is unoperated, relay *da* operates as follows: positive pole of battery 66, *r-dh*, wire *ta'* (positive supply) third path in set A, closed by a relay *ad-1-5* (Fig. 5), wire *tb'* (Fig. 6), *r-db-1*, rectifier R9, fourth path (incoming-call signal), comprising second-path chain 75, *r-dh*, chain *r-SS-1-26* and *r-SX-1-2*, *da*(I), negative pole of battery 66.

With relay *dh* unoperated, relay *da* operates option relay *db-2*: ground, *t-da*, *r-dh*, *r-db-1*, *db-2*, battery. The operation of relay *db-2* ensures the handling of the incoming call by cutting off relays *dh* and *db-1*. The pulse-rate device is started as in the preceding case and causes the stepping chains in both sets to operate in synchronism. Relay *db-2* prepares the positive supplying of the code-sending chains by connecting the positive pole of battery 68 to wire *ta'* and the negative pole to return wire 69 through rectifier R10.

The following circuit is established upon the operation of the first stepping relay in both sets: positive pole of battery 68, *t-db-2*, wire *ta'* (positive supply), first path in set A, wire *tb'*, *r-db-1*, rectifier R9, second path in set B, comprising stepping-contact chain 75, the selecting relays and return wire 69 with *t-dc-2*, rectifier R10, *t-db-2*, negative pole of battery 68. The selecting relays are positioned in both sets under the control of the identification relays of set A, whose front contacts are comprised in the first path of this set, as described with reference to Fig. 5.

After that positioning, relays *cj* and *aj*, *ck*, etc., operate as in the case of an outgoing call.

Fig. 6 shows also the equipment of set B intended to supply set A. The alternating current is supplied from a transformer 76, over condenser bridges 77 and 78, (1) to wires *ta—tb* in parallel and (2) to wires *ta'—tb'* in parallel.

Referring to Fig. 8, the trunk-seizing device provided in set B operates immediately after relay *da*. In this device, each trunk has associated with it, besides the selector on the crossbar switch, with its magnet V-1-8, a seizing relay *ja-1-8* and an auxiliary relay *jm-1-8*. Upon the operation of relay *da*, the relays *ja* of all free trunks, whose magnets V are in home position, are operated: ground, *t-da*, *r-dj*, *r-V-1-8*, *ja*(I)-1-8, battery. Over the chain of contacts of relays *ja* (chain 80), the first in order, namely, relay *ja-N*, locks: ground, *t-da*, *dj*, chain 80 up to *t-ja-N*, *ja*(II)-N, battery, and breaks the chain beyond. Relay *dj* operates and breaks the operating circuit of relays *ja*, which release, except relay *ja-N*, which has been locked. Over chain 81, similar to chain 80, the corresponding auxiliary relay is operated: ground, *t-da*, *t-dj*, chain 81 up to *t-ja-N*, *jm-N*, battery. If all the trunks are busy but one of them is released in time during the code-sending operation, it is seized immediately.

Referring to Fig. 9, a seizing relay *am-1-8* is associated with each trunk in set A. Upon the operation of relay *jm-N* in set B, relay *am-N* operates over the "*a*" wire of the trunk: (Fig. 10) battery, resistor, *t-dj*, *t-jm-N*, wire "*a*" . . . (Fig. 9) wire "*a*", *r-V-N* (a back contact associated with the magnet of the corresponding selector), *am-N*, ground. Relay *am-N* holds independently of this latter contact over the "*a*" wire, *t-am-N*, *am-N*, ground.

The seizing device then waits for the end of the code sending.

The selecting-bar magnets are operated in proportion as the code sending progresses and as the selecting relays are positioned. Referring to Fig. 9 and always assuming that line 17 (that is, line No. 4 in group 2) is a calling or a called line, dividing magnet SX-1 is operated upon the operation of relay *ag-1* over ground, *r-SX-1*, *2* in series, *t-ag-1*, SX-1, battery. It opens its associated back contact, which breaks the operating circuit just mentioned, and holds on reduced current over ground, resistor, *t-ag-1*. Magnets SS-1-26 are controlled by two similar switchings, set up by contacts of selecting relays *ai-1-6*; the first, supplied by relay *ag-3*, controls magnets SS-1-13, while the second, supplied by relay *ag-4*, controls magnets 14-26. For line 17, it is relay *ag-4* that is operated in the code sending. Forthwith, upon the operation of relays *ai-2-3*, magnet SS-17 is operated over ground, *t-ag-4*, *t-ai-2*, *t-ai-3*, SS-17, battery. The operation of relay *am-N* and of magnets SX-1 and SS-17 prepares the fifth path in set A (Fig. 5).

Referring to Fig. 10, in set B magnets SX-1-2 and SS-1-26 are controlled by switchings similar to those of set A but under the general control of relay *da* (over ground, *t-da*, etc.) and magnets SX do not reduce their holding current. The operation of magnets SX and SS prepares the fifth path (over relay *ck*, Fig. 6), and the operation of relay *jm-N* has already prepared the locking circuit of relay *ck*.

When the operation of the synchronized-stepping chains has ended and relays *aj* and *cj* are operated in sets A and B, the fifth paths are switched in and relay *ck* (Fig. 6) operates as described above. Relay *ck* operates the previously-chosen selector: (Fig. 10) ground, *t-ck*, *t-jm-N*, V-N(I), battery. This magnet locks over an advanced "make" contact: ground, *t-jm-N*, *tx-V-N*, V(II)-N, through a fourth relay associated with the trunk, *jn*(I)-N, battery. Relay *jn-N* operates. At the same time, relay *ck* applies positive battery to the "*b*" wire: positive battery, *t-ck*, *t-jm-N*, "*b*" wire. In set A this battery operates the corresponding selector magnet: (Fig. 9) "*b*" wire, *t-am-N*, rectifier R11, V(I)-N, *t-am-N*, *t-am-N* (doubling *r-V-N*), "*a*" wire. The "*a*" wire is at this moment connected to negative battery in set B, as stated above. Set B therefore operates distant magnet V-N of set A under a voltage that is in principle double the normal potential between battery and ground.

A third relay, *jc-1-8* (Fig. 10), associated with each trunk in set B, is operated upon the seizure of trunk N in the case of an incoming call: ground, *t-db-2*, *t-jm-N*, *jc-N*.

The energization of magnet V-N effects the connection in the crossbar switch: trunk N is connected to line 17 on the exchange side. The test cut-off relay *cx-1-52* associated with this line is operated: ground, *t-V-N*, contacts "*d*," *cx-17*, battery. This cuts off the "*c*" wire of line 17, exchange side, from the test and identification devices.

The connection made by magnet V-N places in the case of an incoming call a false subscriber loop on the "*a*" and "*b*" wires towards the exchange: "*a*" wire, "*a*" contacts of the switch resistor, *t-jc-N*, *t-V-N*, resistor, "*b*" contacts and wire. This loop causes the usual operation of the line circuit at the exchange, for example of relay *lr* (Fig. 11): ground, *t-cor*, "*a*" wire, above-mentioned loop, "*b*" wire, *r-cor*, *lr*, battery. Relay *lr* causes the call hunting. In the case of an outgoing call, the exchange "*a*" and "*b*" wires are extended to set A upon the operation of relay *jb*: ground, "*c*" wire, "*c*" contact, *jb*, battery.

In set A (Fig. 9) magnet V-N connects trunk N to line 17, subscriber side. The test cut-off relay *ax-1-52* associated with this line is operated in a locking circuit for magnet V-N: ground, *r-an-N*, *t-V-N*, V(II)-N, "*c*" contacts, *ax-17*, battery. Relay *ax-17* cuts off line 17, whether calling or called, from its supply in set A and from the test and identification devices through which the "*a*" wire is supplied. Relays *an-1-8* are releasing relays associated with the trunks in set A. Relay *an-N* is connected to the "*a*" wire of the trunk by a front contact associated with magnet V-N: ground, *tx-V-N*, *an-N*, rectifier R12, "*a*" wire, but rectifier R12 prevents it from operating in parallel with relay *am-N* and magnet V(I)-N, which are already supplied by this wire.

The operation of magnet V-N in set A breaks the fifth path (Fig. 5), which loops line *ta'-tb'* in this set. It also breaks the operating circuit of relay *ck*(I) (Fig. 6) inserted in the fifth path set up in set B. The locking circuit of this relay, ck(II), is broken by the operation of magnet V–N in set B. Relay ck falls back and breaks the locking circuit of relay da(II), relay dg being operated.

The above operation, following the operation of relay cj at the end of the synchronized stepping, must be covered by the releasing lag of relay df, cut off by relay cj. Were these operations to take an unduly long time, because all the trunks were busy or because of any operating failure, relay df would release first and would cut off relay da.

Relay da upon de-energizing releases the whole control equipment. It removes (Fig. 6) the operating and locking grounds of the stepping and coding relays in set B: relays cj and ch–5, 6 and cg–1, 4 and ci–2, 3 (for line 17) release. It also cuts the supply of stepping line ta–tb, thereby causing the release of relay aj (Fig. 5) in set A. Relay aj upon releasing removes the locking ground from wire 57, thereby causing the release of stepping relay ah–6 and of coding relays ag–1, 4 and ai–2, 3 (for line 17).

Relay da causes the release of relay dg (Fig. 6) and of the operated option relay, db–1 or db–2, depending upon the case. It releases the pulse-rate device (relays dc–1–2 and dd–1, Fig. 7) and the seizing device (relays ja–N, dj and jm–N, Fig. 8). It removes the operating ground of magnets SX and SS (Fig. 10), while the selecting (or coding) relays of set A cut off, upon releasing, the corresponding magnets in this set (Fig. 9).

In the case of an incoming call, the release of relay jm–N (Fig. 10) modifies the supply of the trunk to set A. The "a" wire is grounded: ground, resistor, t–V–N, r–jb–N, r–jm–N, "a" wire. The "b" wire is connected to the battery through relay jc–N, whose operating ground is removed at this moment: "b" wire, r–jm–N, r–jb–N, jc–N, battery. In set A (Fig. 9) relay am–N, short-circuited between two grounds, releases and is disconnected from the trunk. This latter is then extended to the subscriber: "a" wire of trunk N, r–am–N, "a" contacts of the switch, "a" wire to subscriber 17; same connection for the "b" wire. Relay jc (Fig. 10) holds over the calling subscriber's loop while the exchange hunts for the call under the action of the above-mentioned false loop. When the calling line is seized, the exchange applies a ground to the "c" wire and relay jb–N operates: ground, "c" wire, exchange side, jb–N, battery. The line is then fully connected: "a" wire exchange side, "a" contacts, t–jb–N, r–jm–N, "a" wire of the trunk (Fig. 9), above-mentioned connection to the subscriber-side "a" wire; same connection for the "b" wire. Relay jc–N is cut off and falls back slowly. In the case of an outgoing call, relay jb operates immediately on the ground applied to the "c" wire of the outgoing call. Over its grounded front contacts (Fig. 10), relay jb–N holds the locking circuit of magnet V(II)–N.

At the end of the call, the exchange removes the ground from the "c" wire. Relay jb releases and causes the release of magnet V, which causes the release of relay cx. Relay jn holds over its second winding through releasing-relay an of set A: positive battery (Fig. 10), jn(II)–N, r–V–N, r–jb–N, r–jm–N, "a" wire of the trunk (Fig. 9), rectifier R12, an–N, tx–V–N, ground. Relay an operates and breaks the locking circuit of magnet V(II)–N. This magnet releases together with the relay ax included in its locking circuit. Upon releasing, it breaks the circuit of relay an, which releases together with the relay jn included in this latter circuit. The trunk is thus released, and the lines, both on the subscriber and on the exchange side, are connected to the test and identification devices.

A description will now be given of a variant (Figs. 12–16) of Fig. 2 wherein the selection of the magnets of the crossbar switches is controlled by the identification relays. In the embodiment shown it will be assumed that the concentrators carry 12 x 4=48 lines, so as to use 12-element rectifier matrices.

Figure 12:
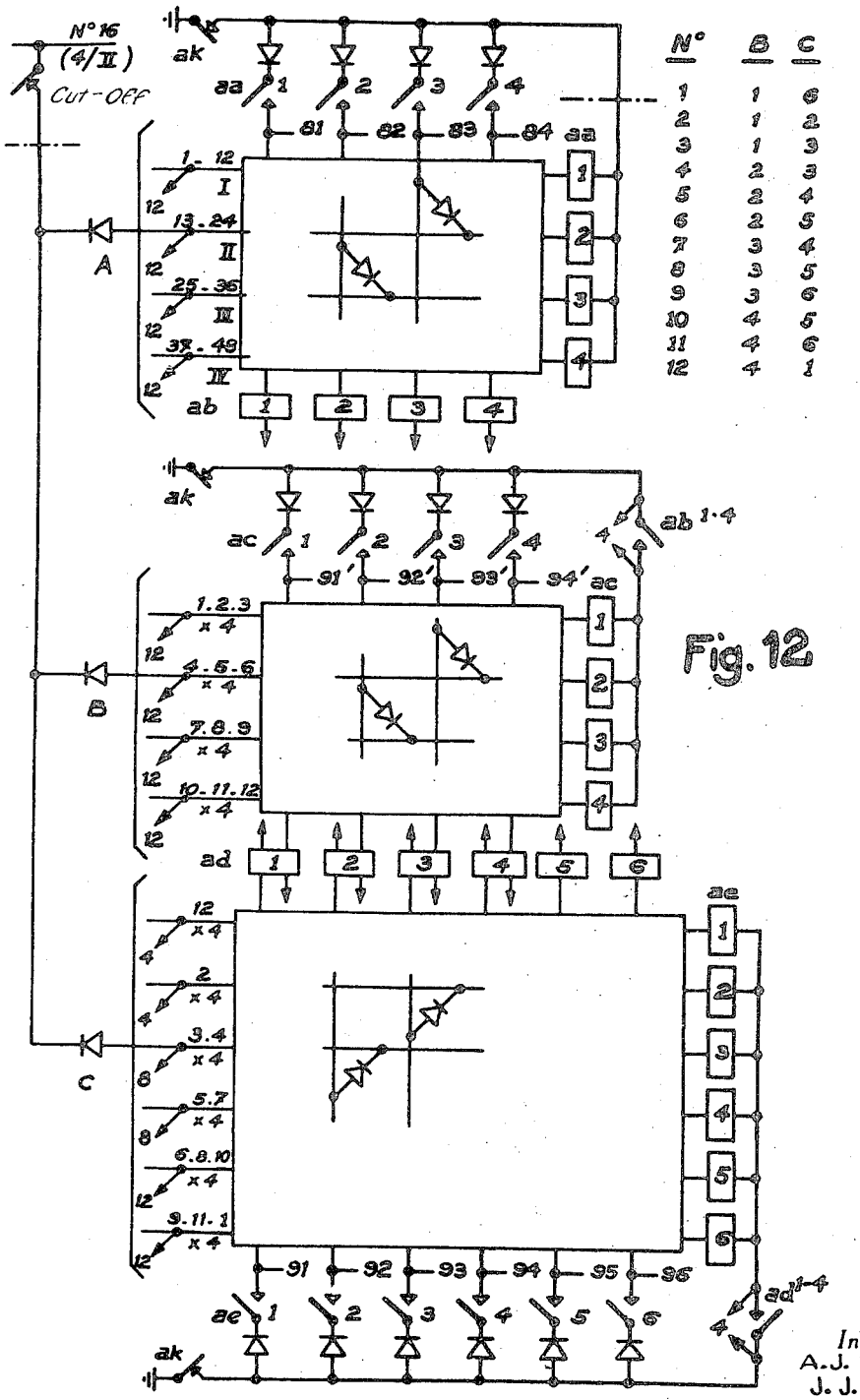
Fig. 12 shows a testing device similar to the one shown in Fig. 4, with a few changes for a variant of the circuits.

Fig. 12 shows the same general layout described with reference to Fig. 4 for call testing and identification. The relationship tables given above are here as follows:

| Group | Lines | Bars | Magnets | Div. Mag. | Iden. Mat. A |
|---|---|---|---|---|---|
| 1 | 1–12 | 1–12 | 1–12 | SX–1 | ab–1 |
| 2 | 13–24 | 1–12 | 13–24 | SX–1 | ab–2 |
| 3 | 25–36 | 1–12 | 1–12 | SX–2 | ab–3 |
| 4 | 37–48 | 1–12 | 13–24 | SX–2 | ab–4 |

| Line | 1 | 2 | 3 | 4 | 5 | 6 | 7 | 8 | 9 | 10 | 11 | 12 |
|---|---|---|---|---|---|---|---|---|---|---|---|---|
| Identif. Mat. B | 1 | 1 | 1 | 2 | 2 | 2 | 3 | 3 | 3 | 4 | 4 | 4 |
| Identif. Mat. C | 6 | 2 | 3 | 3 | 2 | 4 | 5 | 4 | 5 | 6 | 4 | 1 |

In this arrangement, matrix B is a 4-element matrix, like matrix A. It will be assumed that the calling line is No. 16, that is, line No. 4 in group 2. This line will be identified by relays aa–2 and ab–2 in matrix A, relays ac–2 and ad–2 in matrix B and relays ae–3 and ad–3 in matrix C.

For the operation of the identification relays as selection relays positioned in accordance with a call present in the other set, the operating grounds of the matrices are controlled by back contacts of a relay ak, operating taps 81—84 and 91—96 are provided on the (vertical) wires of the identification relays and decoupling rectifiers are included in these wires between these taps and the common operating ground. It will be recalled that in concentrator B, where the test potential is the ground on the "c" wire, the matrices will be supplied by batteries, in practice with resistors in series, and the various rectifiers will be inverted.

Figure 13:
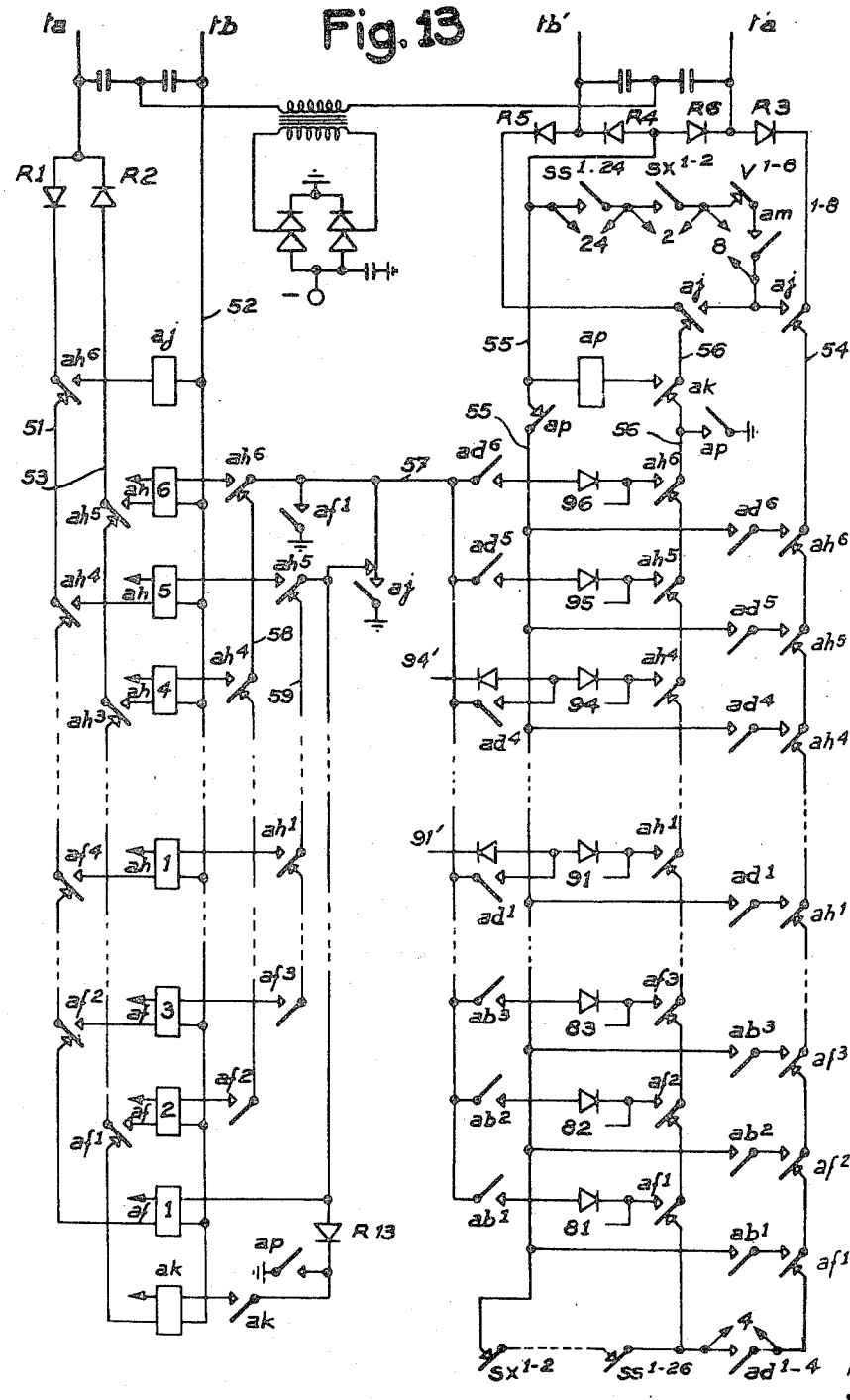
Fig. 13 shows a variant of the chains shown in Fig. 5.

Fig. 13 shows the same general layout of the stepping and code-ending chains as described with reference to Figs. 5. The stepping chain is similar to that of Fig. 5 but with a relay ak added at the end of the contact chain 53 (negative path) operating the even relays. In the case of an incoming call, the first stepping pulse is positive, as in the case of Fig. 5; relay af–1 operates and switches chain 53 to relay af–2, which is operated by the second pulse, a negative pulse. Relay ak does not operate, and the general operation is as has been described above. In the case of an outgoing call, the first pulse will be negative and will operate relay ak, after which the next pulses, positive and negative, will cause the chain to operate as in the preceding case.

The sending chain comprises no relays, because it positions the identification relays of Fig. 12 (ab–1–4 and ad–1–6). However, the general arrangement of its paths is the same, and its auxiliary paths, namely, the third (incoming-call signal), the fourth (normally closed loop offered to the outgoing-call signal) and the fifth (supervision of the connection) are similar.

In the first path, contact chain 54 is looped directly to return wire 55 under the control of identification contacts for incoming calls. The second path, which must position the identification relays in the case of an outgoing call, closes at the beginning of chain 56 on a pulsing relay ap after the operation of relay ak in the stepping chain. The rest of the chain is then supplied, at moments determined by set B, by the ground pulses repeated by relay ap, which is cut off at the same time from the rest of return wire 55 (the ground contact, t–ap over the rest of chain 56 and contact r–ap in wire 55). Chain 56 directs these pulses to wires 81—84 and 91—96 in order to operate the corresponding identification relays.

The operation of the device of Fig. 13 in the case of an outgoing call is as follows. The call signal flows over the fourth-path loop: wire tb', rectifier R5, contact chain 56, contact chains r–SS–1–24 and r–SX–1–2, wire 55 bis, r–ap, wire 55, rectifier R6, wire ta'. The sending chain is supplied in this direction (negative). Set B thereupon sends the stepping pulses. The first stepping pulse properly so called (positive) is preceded in this case by a negative pulse constituting the outgoing-call signal. Relay ak operates and over t–ak loops the second sending path to relay ap, which operates. Relay ap locks relay ak over ground, t–ap, t–ak, ak(II), battery. A rectifier R13 prevents this ground from reaching relay af-1 and locking-wire 57.

The operation of relay ak removes the grounds (or other potentials) supplying the identification relays (Fig. 12). These relays fall back, if any of them were operated for incoming calls.

Upon the first stepping pulse (operation of relay dd-1, Fig. 7) the first relay operates in both sets. In set B it is relay cf-1 (Figs. 6 and 14) that breaks sending line ta'-tb', thus causing the release of relay ap (Fig. 13). In set A it is relay af-1, which locks by applying a ground to wire 57. Relay ap is somewhat slow in releasing, so as not to remove the locking ground it applies to relay ak before the operation of relay af-1 has applied another locking ground. Relay ak thus holds in spite of this switching.

It will be assumed that line No. 16 is called, so it will be a question of positioning relays ab-2, ad-2 and ad-3 (Fig. 12). On the second stepping, relay af-2 (Fig. 13) is operated, after which a coding pulse is sent to line ta'-tb'. This pulse operates relay ap, which repeats the pulse to chain 56 bis. Over t-af-2, this pulse is applied to wire 82 which leads to relay ab-2 (Fig. 12). This relay operates and locks (Fig. 13) over ground, t-af-1, wire 57, t-ab-2, rectifier and wire 82. Upon the sixth stepping, relay ah-2 operates, after which a coding pulse is sent and operates relay ap, which repeats it to chain 56 bis. Over t-ah-2 this pulse is applied to wire 92, which leads to relay ad-2 (Fig. 12). This relay operates over its winding belonging to matrix C and locks via its two windings, one belonging to matrix C and the other belonging to matrix B, over locking wire 57 (Fig. 13), t-ad-2, rectifier and wire 92 and rectifier and wire 92'. Upon the seventh stepping, relay ad-3 operates and locks in the same manner. It will be noticed that relays ad-5 and ad-6, belonging only to matrix C, have only one operating and locking wire (95, 96), like relays ab-1-4. The application of locking grounds to the two matrices B and C whereof relays ad-1-4 form part ensures the full busying of the test device, as if an incoming call from line No. 16 had been held. Relay ak can therefore be released after the coding of the call; so long as the locking ground of the identification relays is held (over wire 57), no incoming calls will have any effect on the test and identification devices.

The positive supply applied to line ta-tb after the tenth stepping pulse will operate relay aj, which switches sending line ta'-tb' to the fifth path (supervision of the connection) and releases relays ab-5 and ak while holding the locking ground on wire 57, as in the first variant (Fig. 5).

Figure 14:
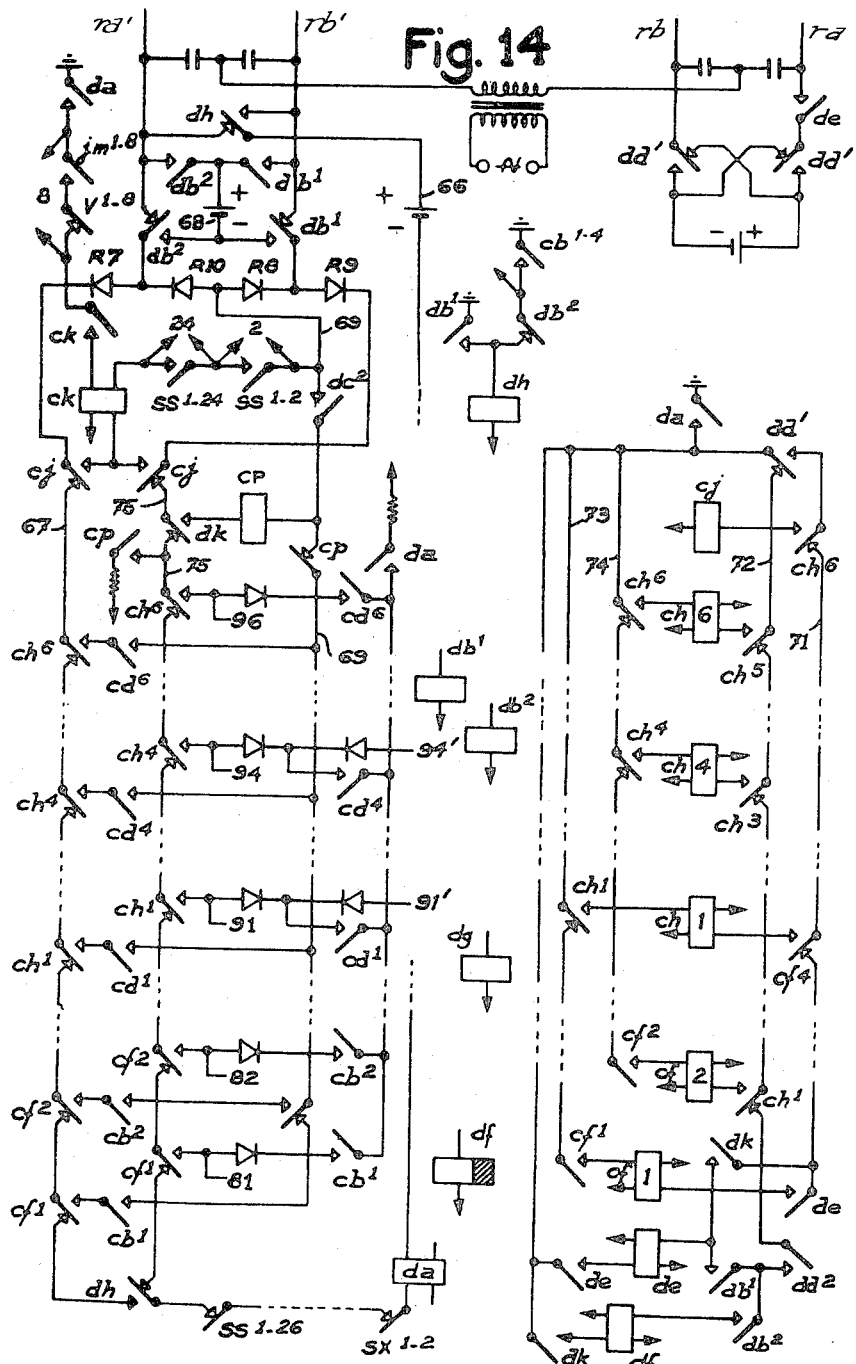
Fig. 14 shows a corresponding variant of the chains and relays shown in Fig. 6.

Fig. 14 shows the same general layout of the stepping and code-sending chains of set B as described with reference to Fig. 6. The stepping chain is similar to that of Fig. 6, but with relays de and dk added at the end of the contact chain 72 (negative path) operating the even relays. The ground applied to this chain upon the pulling up of relay da does not reach any relay. Upon the starting of the pulse-rate device (Fig. 7), the first positive pulse, upon the pulling up of relay dd-1, also has no effect. Upon the first negative pulse, when dd-1 falls back, while dd-2 remains operated, relay de or dk, depending upon the case, will finally operate, as will be seen.

If an outgoing call is involved, relay de operates over ground, t-da, r-dd-1, chain 72, t-dd-2, t-db-1, de(1), battery, and locks over ground, t-da, t-de(II), battery. Relay de closes line ta-tb, in which is inserted its contact t-de instead of t-da (Fig. 6), and a negative pulse is sent to set A in order to signal as described above that an outgoing call is going to be handled (operation of relay ak, Fig. 13). The next pulling up of relay dd-1 produces the first stepping pulse (positive). In set B, relay cf-1 is operated over ground, t-da, t-dd-1, chain 71, t-de, cf(II)-1, battery. The rest of the operation is the same as in the first variant (Fig. 6).

If an incoming call is involved, it is relay dk that operates, over t-db-2, instead of relay de, and locks over t-dk, dk(II). Relay dk, similar to relay ak of Fig. 13, cuts off the identification relays of set B and switches in a repeating relay cp, similar to relay ap (Fig. 13), in the code-sending chain. Relay de does not operate at this time, so that line ta—tb remains broken and the negative pulse is not sent to set A over this line. Upon the next pulling up of relay dd-1 (first stepping pulse-positive), relay de operates over chain 71, t-dk, de(I) battery, and locks. Relay de closes line ta—tb, so that this pulse is sent to set A. In set B, relay cf-1 operates at the same time over chain 71, t-de, cf(I)-1 and locks. The rest of the operation is the same as in the preceding case, as in the first variant.

In the code-sending chain, the ringing and supervision paths are similar to those of the first variant (Fig. 6), while the code-sending paths are made up as in set A (Fig. 13). In the first path (outgoing calls), contact chain 67 is looped directly to return wire 69 by identification contacts cb-1-4, cd-1-6. The second path, which must position the identification relays of set B in the case of an incoming call, is closed, at the beginning of contact chain 75, on pulse-repeating relay cp after the operation of relay dk in the stepping chain. The rest of the chain, with its identification contacts 75 bis, its outgoing wires 81—84, 91—96 and 91'—94', with the corresponding rectifiers, to the identification relays of set B, and its locking contacts, is made up the same as in set A (Fig. 13) but is supplied by strong batteries, instead of by grounds, considering the polarity of the test device of set B. The operation of the code-sending chain with its various paths will be clear from what has been explained with respect to the operation of the code-sending chain of set A (Fig. 13).

Figure 15:
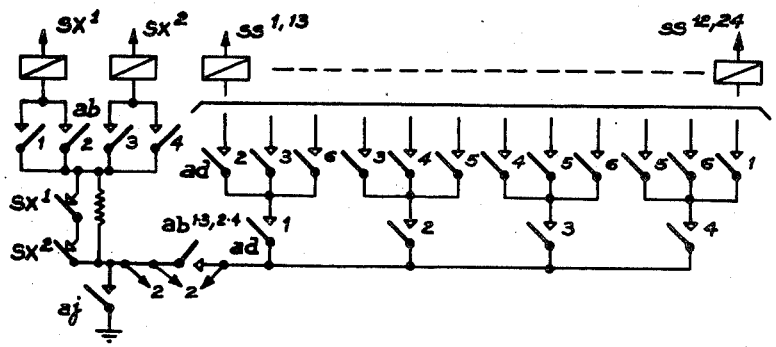
Fig. 15 shows a corresponding variant of the equipment of the selecting-bar magnets in set A, shown at the bottom of Fig. 9.

Fig. 15 shows the selecting device of set A, made up of contacts of the identification relays. The two series of selecting-bar magnets, SS-1-12 and SS-13-24, are reached by means of two routing switches constituted by contacts of relays ad-1-6, one of which is shown. One of these switches is supplied by contacts of relays ab-1 or ab-3 for lines No. 1-12 or 25-36 and the other by contacts of relays ab-2 or ab-4 for lines No. 13-24 or 37-48. The dividing magnets are reached as follows: SX-1 via ab-1 or ab-2, for lines No. 1-24, and SX-2 via ab-3 or ab-4, for lines No. 25-48. Thus, line No. 16, whose code is ab-2, ad-2, 3, will be reached by magnets SX-1 and SS-16. All these switches are supplied under the control of relay aj but, in the case of an outgoing call, they could be as soon as relay ak (Fig. 13) has erased the identification of an incoming call, that is, as soon as relay af-1 has operated, in order to stagger the energization of the magnets.

Figure 16:
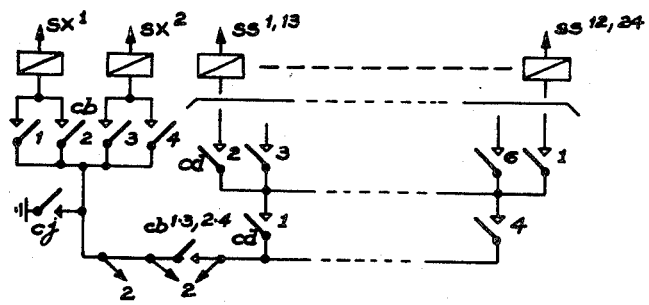
Fig. 16 shows a corresponding variant of the equipment of set B, shown at the bottom of Fig. 10.

Fig. 16 shows the selecting device of set B. This device, made up of contacts of relays cb-1-4 and cd-1-6 under the general control of relay cj, is similar to the preceding one.

A description will now be given of a variant (Figs. 17-20) of the equipment of set B embodying the general arrangement of Fig. 3, with 4 trunks assigned to outgoing calls and 4 trunks assigned to incoming calls. These latter trunks are extended to the second finders at the exchange.

Referring to Fig. 17, the trunk-seizing device shown is similar to that of Fig. 8. However, a set of seizing relays, ja-1-4 and jm-1-4, controlled by back contacts Vj-1-4 and the front contact of db-1, is assigned to the 4 outgoing trunks, "a"s-"b"s, connected by selector magnets Vj-1-4, while another set of seizing relays, ka-1-4 and km-1-4, controlled by back contacts Vk-1-4 and the front contact of db-2, is assigned to the 4 incoming trunks, "a"e-"b"e, connected by selector magnets Vk-1-4. As relays jm and km are here slow-releasing, the access to relays *ja* and *ka* is controlled not alone by the back contact of the corresponding magnets, V*j* and V*k*, but also by that of relays *jm* and *km*. Aside from this, the operation is as described for Fig. 8.

Fig. 18, which corresponds to the upper portion of Fig. 10, shows the trunk-connecting device, at the top for the outgoing trunks, as in the case of an outgoing call in Fig. 10, and at the bottom for the incoming trunks, which are here handled in a different way.

The case will be assumed first of an outgoing call. Upon the operation of relay *ck* (Fig. 6), and the seizing device (Fig. 17) having seized a pair of relays *ja*–N, *jm*–N belonging to an outgoing trunk N, the corresponding selector magnet is operated: ground, *t*–*ck*, *t*–*jm*–N, V*j*(I)–N, battery. It locks: ground, *t*–V*j*–N, *t*–*jm*–N, V*j*(II+I)–N, battery, and operates the corresponding relay *jn*–N: ground, *t*–V*j*–N, *jn*(I)–N, battery. At the same time, as described with reference to Fig. 10, relay *ck* applies positive battery to wire "*b*"*s*, and negative battery has been applied to wire "*a*"*s* by relay *dj*, the effect of this being to operate the corresponding selector magnet in set A (Fig. 9).

The pulling up of magnet V*j*–N effects the connection, in the crossbar switch, of input No. 17, assumed to be calling, at output N. Relay *jb*–N operates then on the ground on the "*c*" wire coming from the exchange and over the local "*d*" wire operates the cut-off relay: ground, *t*–*jb*–N, "*d*" contact, *cx*–17, battery. The latter breaks the "*c*" wire on the exchange side, No. 17, of the test and identification devices.

After the operation of the connecting device in set A (Fig. 9), described above, relay *ck* (Fig. 6) falls back, followed by relay *da*, which releases the other relays, including those of the seizing device (Fig. 17). Relay *jm*–N holds because of its slow release and, in the meantime, relay *am*–N (Fig. 9) falls back. In releasing, relay *jm*–N extends the calling line's connection to trunk "*a*"*s*–"*b*"*s*. The selector magnet holds over ground, *t*–V*j*–N, *t*–*jb*–N, V*j*(II+I)–N, battery. The trunk is supplied from the exchange: ground on the "*a*" wire and battery on the "*b*" wire. In set A, relay *am*–N being released, the trunk is extended to the called subscriber.

After the connection, the exchange removes the ground on the "*c*" wire. Relay *jb* releases and causes the release of magnet V*j* and of relay *cx*. Relay *jn* holds by applying positive battery to the "*a*"*s* wire: positive battery, *t*–*jn*–N, *jn*(II)–N, *r*–V*j*–N, *r*–*jm*–N, "*a*"*s* wire. In set A, this battery operates releasing relay *an* (Fig. 9) as above described. Relay *an* causes the disconnection of the line and is itself disconnected, thereby causing relay *jn* (Fig. 18) to release. The trunk is thus released in both sets.

The case of an incoming call will now be assumed. Upon the operation of relay *ck* (Fig. 6), and the seizing device (Fig. 17) having seized a pair of relays *ka*–N, *km*–N belonging to an incoming trunk N, the corresponding selector magnet is operated: ground, *t*–*ck*, *t*–*km*–N, V*k*(I)–N, battery. A relay *kc* was operated upon the seizure of the trunk: ground, *t*–*km*–N, *kc*(I)–N, battery. Magnet V*k* locks: ground, *t*–V*k*–N, *t*–*kc*–N, V*k*(II+I)–N, battery (this locking circuit, as in the case of an outgoing call, will be effective only after the release of relay *ck*) and operates a relay *kn*: same ground, *t*–V*k*–N, *kn*(I)–N, battery. Negative battery is applied to the "*a*"*e* wire by the operation of relay *dj*, and the operation of *ck* applies positive battery to the "*b*"*e* wire, the effect of this being to operate the corresponding selector magnet in set A.

The pulling up of magnet V*k*–N effects the connection, in the crossbar switch, of input N at output No. 17, assuming that the call is from subscriber No. 17. This connection affects only the "*c*"–"*d*" wires. Relay 17 is operated over ground, *t*–V*k*–N, "*d*" contact, *cx*–17, battery, and breaks the "*c*" wire, exchange side, No. 17, of the test and identification devices. The "*c*" wire of the subscriber's outgoing position is connected by the "*c*" contacts of selector V*k*–N to the second finder's "*c*" wire.

Finally, the pulling up of magnet V*k* switches in a relay *k*6–N on the "*d*" wire of the trunk between set B and the second finders (assuming a system wherein these are 4-wire trunks).

In the system assumed, the meter of subscriber No. 17 is connected to the "*c*" wire of his outgoing position (Fig. 19). In the trunk to the second finders (Fig. 20) the "*c*" wire crosses a winding of relay *lh*. The "*d*" wire is interrupted there: on the set B side it is connected to a relay *lt*; on the finders' side it is connected to another winding of relay *lh*.

The pulling up of magnet V*k*–N places a false subscriber loop on the "*a*"–"*b*" wires towards the finders: exchange-side "*a*" wire, *t*–V*k*–N, resistor, *t*–*kc*–N, resistor, *t*–V*k*–N, "*b*" wire towards the exchange. Relay *lt* (Fig. 20) operates: ground, *lt*(II+I), "*d*" wire . . . (Fig. 18) *t*–V*k*–N, *kb*–N, battery. Relay *lt* applies a starting and test ground to the "*d*" wire towards the finders. Relay *kb* does not operate in series with the two windings of relay *lt*.

After the operation of the connecting device in set A following the pulling up of magnet V*k* in set B, relay *ck* releases and causes the release of all the other relays mentioned above, including relays *ka*–N and *km*–N. In set A, relay *am*–N (Fig. 9) falls back during the return of *km*–N and extends the trunk up to the calling subscriber. Relay *kc*, slow-releasing, holds briefly after the release of relay *km*–N, over: ground, *r*–*kb*–N, *r*–*km*–N, "*a*"*e* wire . . . subscriber's loop through set A . . . "*b*"*e* wire, *r*–*km*–N, *r*–*kb*–N, *kc*(II)–N, battery.

When the hunting for the call by the exchange's second finders has ended, ground is applied to the "*c*" wire, and relay *lh* (Fig. 20) operates. Relay *lh* applies a ground to the low-resistance first winding of relay *lh*, thereby causing the operation of relay *kb*–N in set B. Relay *kb* extends the "*a*"–"*b*" wires and thus connects the subscriber to the exchange. It cuts off relay *kc*, which releases slowly. The selector magnet holds over ground, *tx*–V*k*–N, *t*–*kb*–N, V*k*(II+I)–N, battery.

During the call, the metering pulses sent by the exchange to the "*c*" wire of the second finders reach, over the connection established in set B with the "*c*" wire of the outgoing positions, the calling subscriber's meter (Fig. 19), connected to this latter wire.

After the call, relay *kb* releases and causes magnet V*k* to release. Positive battery is then applied to the "*a*"*e* wire through the second winding of relay *kn* and it causes the release of the trunk in both sets, as described above.

While the invention has been described in detail with reference to specific embodiment examples, it is obvious that it is not limited thereto but on the contrary is capable of variants and modifications without departing from its scope.

What is claimed is:

1. A concentrator for connecting a group of telephone subscriber lines to their corresponding positions in an exchange over a smaller number of trunks, comprising a first set of switches of the cross-bar type in the immediate vicinity of said group of subscriber lines with said subscriber lines connected to the horizontal multiples of said switches controlled by the selecting bars, a plurality of trunks connected to the vertical multiples controlled by the selectors, there being less trunks than there are subscriber lines, a second set of switches of the cross-bar type at the exchange with the positions corresponding to said subscriber line connected to the horizontal multiples and the other ends of said trunks connected to the vertical multiples controlled by the selectors, first and second test devices each comprising a plurality of rectifier matrices and positioned respectively adjacent said first and second sets of switches, said first test device having a plurality of inputs each connected to a different combination of the subscribers' lines, means for energizing an input of said first test device when a line connected thereto is in calling condition, said second test device having a plurality of inputs each connected to a different combination of the corresponding positions at said exchange, means for energizing an input of said second test device when a position connected thereto is in calling condition, a plurality of two-condition devices in each matrix adapted to be normally in one condition, means including the rectifiers of said matrix for causing one of said two-condition devices to shift to its other condition when one of the inputs of said matrix is energized, and means operated by the combination of two-condition devices shifted for transmitting signals indicating the existence of a call and the identity of the line or position which is in calling condition.

2. A concentrator, as defined in claim 1, further comprising an option device connected to one of the sets of switches and responsive to signals from both sets of switches indicating the existence of calls for choosing the set whose call is to be handled.

3. A concentrator, as defined in claim 2, in which the signal transmitting means comprises a separate sending device connected to each set of switches for sending the identity of a handled call originating in one set of switches to the other set, each of said sending devices comprising a pulse-controlled switching device for defining a sequence of synchronized time elements in both sets and a switching device controlled by said pulse-controlled switching device and by the associated test device for sending the elements of the identity combination.

4. A concentrator, as defined in claim 3, further comprising a two-wire line defining two different paths in different directions between the sending devices, means in the test device responsive to the unoperated condition of the associated time-element-defining device for establishing one of said paths in its normal condition for sending the signal indicating the existence of a call to the other set of switches and an independent path for use when the other set has a call, means for checking whether or not said paths are in their normal condition, a second two-wire line defining two different paths between said first and second sets of switches, means in said device responsive to the operation of the associated time-element-defining device for establishing a path over said second two-wire line for sending the identity combination to the other set of switches and an independent path for use in sending the identity of a call established in said other set of switches, and means responsive to the end of the operation of said time-element-defining device for establishing still another path for supervision of the connection operations, a source of pulses of opposite sign, means forming two paths connecting said source with the controlled time-element-defining device, means including rectifiers for using said paths alternately to deliver pulses of opposite sign to said device, and means for maintaining a potential on said device at the termination of said pulses.

5. A concentrator, as defined in claim 2, further comprising a selecting device for each switch set adapted to control the selecting bars thereof, selectors for controlling the trunks, a test device associated with one of the sets of switches for seizing a free trunk in response to operation of the option device for the purpose of handling a call, each set of switches having a connection device arranged to operate said selecting bars of its switch under control of said selecting device and to operate the selectors in both sets controlling the trunk seized by said testing device, releasing means in said connecting devices, and means operating in response to the release of the connected positions corresponding to the connected line operating said releasing means for disconnecting the connected line from the associated test device.

6. A concentrator, as defined in claim 5, further comprising means for supplying the first set of switches with alternating current from the second set of switches comprising means for utilizing the two wires of the time-element sending line as one wire and utilizing the two wires of the identity-sending line as the other wire, and means in said first set comprising a transformer and a rectifier bridge for utilizing the alternating current so supplied.

7. A concentrator, as defined in claim 1, in which the means for causing one of the two-condition devices to shift to its other condition when one of the inputs of the matrix is energized includes means for short-circuiting all the other two-condition devices to prevent their shifting.

References Cited in the file of this patent

UNITED STATES PATENTS

| | | |
|---|---|---|
| 2,532,097 | Hersey | Nov. 28, 1950 |
| 2,724,746 | Bruce | Nov. 22, 1955 |
| 2,806,088 | Joel | Sept. 10, 1957 |
| 2,812,385 | Joel | Nov. 5, 1957 |
| 2,837,602 | Lundkvist | June 3, 1958 |